United States Patent
Nagatoshi et al.

(10) Patent No.: US 10,852,535 B2
(45) Date of Patent: Dec. 1, 2020

(54) IMAGING LENS AND OPTICAL APPARATUS

(71) Applicant: FUJIFILM Corporation, Tokyo (JP)

(72) Inventors: Yukiko Nagatoshi, Saitama (JP); Shunsuke Miyagishima, Saitama (JP); Kazuyoshi Okada, Saitama (JP); Ukyo Tomioka, Saitama (JP); Masaru Yonezawa, Saitama (JP); Yasutaka Shimada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 155 days.

(21) Appl. No.: 16/133,038

(22) Filed: Sep. 17, 2018

(65) Prior Publication Data

US 2019/0094533 A1 Mar. 28, 2019

(30) Foreign Application Priority Data

Sep. 25, 2017 (JP) ................... 2017-183862

(51) Int. Cl.
| | |
|---|---|
| G02B 27/00 | (2006.01) |
| G02B 13/00 | (2006.01) |
| G02B 9/64 | (2006.01) |
| G02B 13/04 | (2006.01) |
| G02B 15/177 | (2006.01) |

(52) U.S. Cl.
CPC .......... *G02B 27/0025* (2013.01); *G02B 9/64* (2013.01); *G02B 13/0045* (2013.01); *G02B 13/04* (2013.01); *G02B 15/177* (2013.01)

(58) Field of Classification Search
CPC ........ G02B 27/0025; G02B 9/04; G02B 9/12; G02B 9/34; G02B 9/60; G02B 9/62; G02B 9/64; G02B 13/005; G02B 13/0055; G02B 13/0045

See application file for complete search history.

(56) References Cited

U.S. PATENT DOCUMENTS

| | | | |
|---|---|---|---|
| 2003/0156335 A1 | 8/2003 | Takatsuki | |
| 2008/0231962 A1 | 9/2008 | Yamada | |
| 2013/0003189 A1* | 1/2013 | Sanjo | G02B 15/173 359/686 |
| 2017/0108680 A1* | 4/2017 | Kikuchi | G02B 15/177 |
| 2017/0336607 A1* | 11/2017 | Nakano | G02B 13/146 |
| 2018/0095242 A1* | 4/2018 | Iwamoto | G02B 9/64 |
| 2019/0041605 A1* | 2/2019 | Saito | G02B 27/646 |

FOREIGN PATENT DOCUMENTS

| | | |
|---|---|---|
| JP | 2003-222793 A | 8/2003 |
| JP | 2008-046259 A | 2/2008 |

* cited by examiner

*Primary Examiner* — Jordan M Schwartz
(74) *Attorney, Agent, or Firm* — Studebaker & Brackett PC

(57) ABSTRACT

The imaging lens includes at least one negative lens that satisfies predetermined Conditional Expressions (1) to (3) indicating conditions in which dispersion is relatively low and refractive index is high while having a negative rate of change of the refractive index. A positive lens having a largest Abbe number at the d line among positive lenses included in the imaging lens satisfies predetermined Conditional Expressions (4) and (5).

16 Claims, 16 Drawing Sheets

EXAMPLE 5

EXAMPLE 6

EXAMPLE 7

EXAMPLE 3

EXAMPLE 4

EXAMPLE 7

IMAGING LENS AND OPTICAL APPARATUS

CROSS REFERENCE TO RELATED APPLICATIONS

The present application claims priority under 35 U.S.C. § 119 to Japanese Patent Application No. 2017-183862 filed on Sep. 25, 2017. The above application is hereby expressly incorporated by reference, in its entirety, into the present application.

BACKGROUND OF THE INVENTION

1. Field of the Invention

The present invention relates to an imaging lens suitable for a digital camera, a projector or the like, and an optical apparatus including this imaging lens.

2. Description of the Related Art

As imaging lenses suitable for an optical apparatus such as a digital camera or a projector, imaging lenses disclosed in, for example, JP2003-222793A or JP2008-46259A have been known.

SUMMARY OF THE INVENTION

It is important to suppress chromatic aberration in order to realize a high-definition imaging lens, and a material having large abnormal dispersibility is effective in correcting a secondary spectrum of chromatic aberration. There is a problem in that a material having large abnormal dispersibility has a large change in refractive index with respect to a change in temperature, and that the use of this material in a positive lens causes a focus position to extend during a rise in temperature.

Lens systems disclosed in JP2003-222793A and JP2008-46259A all correct defocusing caused in a positive lens having large abnormal dispersibility by combining a negative lens having large abnormal dispersibility likewise. Such a method is a measure effective in the correction of defocusing with a change in temperature and the correction of chromatic aberration, but there is a problem in that, since a material having a low refractive index has to be used in a negative lens for the purpose of temperature correction, the correction of field curvature is not sufficiently performed.

The present invention has been contrived in view of such circumstances, and an object thereof is to provide an imaging lens in which various aberrations such as chromatic aberration and field curvature are satisfactorily corrected while satisfactorily correcting defocusing due to a change in temperature, and an optical apparatus including this imaging lens.

According to the present invention, there is provided an imaging lens in which a plurality of lenses are combined with each other, comprising at least one negative lens that satisfies the following Conditional Expressions (1) to (3) in a case where a refractive index at a d line of a negative lens included in the imaging lens is set to nN, an Abbe number at the d line of the negative lens is set to $\nu$N, and a rate of change of the refractive index at the d line of the negative lens with respect to a change in temperature at 25° C. is set to dnN/dt, wherein a positive lens having a largest Abbe number at the d line among positive lenses included in the imaging lens satisfies the following Conditional Expressions (4) and (5) in a case where an Abbe number at the d line of the positive lens having a largest Abbe number at the d line is set to $\nu$P1, and a partial dispersion ratio of the positive lens having a largest Abbe number at the d line is set to $\theta$P1gF.

$$1.65 < nN < 1.75 \tag{1}$$

$$45 < \nu N < 55 \tag{2}$$

$$dnN/dt < 0 \times 10^{-6}/°\text{ C.} \tag{3}$$

$$63 < \nu P1 \tag{4}$$

$$0.644 < \theta P1gF + 0.001618 \times \nu P1 \tag{5}$$

Meanwhile, it is preferable that the negative lens that satisfies Conditional Expressions (1) to (3) satisfies at least one of Conditional Expressions (1-1), (2-1), and (3-1).

$$1.69 < nN < 1.71 \tag{1-1}$$

$$50 < \nu N < 52 \tag{2-1}$$

$$-2 \times 10^{-6}/°\text{ C.} < dnN/dt < -1 \times 10^{-6}/°\text{ C.} \tag{3-1}$$

In addition, it is preferable that the positive lens having a largest Abbe number at the d line among positive lenses included in the imaging lens satisfies at least one of Conditional Expressions (4-1) and (5-1).

$$75 < \nu P1 < 100 \tag{4-1}$$

$$0.665 < \theta P1gF + 0.001618 \times \nu P1 < 0.7 \tag{5-1}$$

In the imaging lens of the present invention, in a case where a focal length of the negative lens is set to fN, and a focal length of the whole system during focusing on an infinite object is set to f, at least one negative lens among negative lenses that satisfy Conditional Expressions (1) to (3) preferably satisfies the following Conditional Expression (6), and more preferably satisfies the following Conditional Expression (6-1). Meanwhile, in a case where the imaging lens is provided with a zooming function, it is preferable to satisfy the following Conditional Expression (6) and/or (6-1) in one place within a zooming region. In addition, in a case where negative lenses are cemented, it is assumed that the front and back of the negative lenses are calculated as air.

$$|fN|/f < 10 \tag{6}$$

$$0.5 < |fN|/f < 5 \tag{6-1}$$

In addition, it is preferable to include at least one positive lens that satisfies the following Conditional Expressions (7) to (9) in a case where a refractive index at the d line of a positive lens included in the imaging lens is set to nP2, an Abbe number at the d line of the positive lens is set to $\nu$P2, and a rate of change of the refractive index at the d line of the positive lens with respect to a change in temperature at 25° C. is set to dnP2/dt.

$$1.6 < nP2 < 1.85 \tag{7}$$

$$40 < \nu P2 < 60 \tag{8}$$

$$6 \times 10^{-6}/°\text{ C.} < dnP2/dt \tag{9}$$

Here, it is preferable that the positive lens that satisfies Conditional Expressions (7) to (9) further satisfies at least one of Conditional Expressions (7-1), (8-1), and (9-1).

$$1.65 < nP2 < 1.8 \tag{7-1}$$

$$42 < \nu P2 < 57 \tag{8-1}$$

$$6.5 \times 10^{-6}/°\text{ C.} < dnP2/dt < 11 \times 10^{-6}/°\text{ C.} \tag{9-1}$$

In addition, in a case where a focal length of the positive lens is set to fP2, and a focal length of the whole system during focusing on an infinite object is set to f, the positive lens that satisfies Conditional Expressions (7) to (9) preferably satisfies the following Conditional Expression (10), and more preferably satisfy the following Conditional Expression (10-1). Meanwhile, in a case where the imaging lens is provided with a zooming function, it is preferable to satisfy the following Conditional Expression (10) and/or (10-1) in one place within a zooming region. In addition, in a case where positive lenses are cemented, it is assumed that the front and back of the positive lenses are calculated as air.

$$fP2/f<15 \tag{10}$$

$$0.2<fP2/f<5 \tag{10-1}$$

In addition, the imaging lens may be a single-focus lens. In that case, it is preferable to satisfy the following Conditional Expression (11), and more preferable to satisfy the following Conditional Expression (11-1) in a case where a height of a paraxial on-axis light ray on an object-side surface of the negative lens that satisfies Conditional Expressions (1) to (3) is set to HN, and a maximum value of heights of a paraxial on-axis light ray on each lens surface of all lenses included in the imaging lens is set to Hmax.

$$0.3<|HN/H\max| \tag{11}$$

$$0.49-|HN/H\max|<1 \tag{11-1}$$

In addition, the imaging lens may have a zooming function. In that case, in a case where defocusing with a change in temperature is corrected throughout the entire zooming region, it is preferable to satisfy the following Conditional Expression (12), and more preferable to satisfy the following Conditional Expression (12-1) in a case where a height of a paraxial on-axis light ray at a telephoto end on an object-side surface of the negative lens that satisfies Conditional Expressions (1) to (3) is set to HNt, a height of a paraxial on-axis light ray at the telephoto end of a surface having a maximum height of a paraxial on-axis light ray at a wide-angle end on each lens surface of all lenses included in the imaging lens is set to Htwm, a height of a paraxial on-axis light ray at the wide-angle end on the object-side surface of the negative lens that satisfies Conditional Expressions (1) to (3) is set to HNw, and a maximum value of heights of a paraxial on-axis light ray at the wide-angle end on each lens surface of all lenses included in the imaging lens is set to Hwwm.

$$|(HNt/Htwm)/(HNw/Hwwm)|<1.8 \tag{12}$$

$$0.4<|(HNt/Htwm)/(HNw/Hwwm)|<1.5 \tag{12-1}$$

In addition, the imaging lens may have a zooming function. In that case, particularly, in a case where defocusing with a change in temperature at the telephoto end is corrected, it is preferable to satisfy the following Conditional Expression (13), and more preferable to satisfy the following Conditional Expression (13-1) in a case where a height of a paraxial on-axis light ray at a telephoto end on an object-side surface of the negative lens that satisfies Conditional Expressions (1) to (3) is set to HNt, a height of a paraxial on-axis light ray at the telephoto end of a surface having a maximum height of a paraxial on-axis light ray at a wide-angle end on each lens surface of all lenses included in the imaging lens is set to Htwm, a height of a paraxial on-axis light ray at the wide-angle end on the object-side surface of the negative lens that satisfies Conditional Expressions (1) to (3) is set to HNw, and a maximum value of heights of a paraxial on-axis light ray at the wide-angle end on each lens surface of all lenses included in the imaging lens is set to Hwwm.

$$1.8<|(HNt/Htwm)/(HNw/Hwwm)| \tag{13}$$

$$2<|(HNt/Htwm)/(HNw/Hwwm)|<50 \tag{13-1}$$

According to the present invention, there is provided an optical apparatus comprising the above-described imaging lens of the present invention.

Meanwhile, the term "consist of ~" is intended to be allowed to include a lens having substantially no refractive power, optical elements, other than a lens, such as a stop, a mask, cover glass, or a filter, mechanism portions such as a lens flange, a lens barrel, an imaging element, or a camera-shake correction mechanism, and the like, in addition to the things enumerated as elements.

In addition, the surface shape, the sign of the refractive power, and the curvature radius of the lens are assumed to be those in a paraxial region in a case where an aspherical surface is included.

In addition, the partial dispersion ratio θgF is represented by the following expression in a case where a refractive index at a g line (a wavelength of 435.8 nm) is set to ng, a refractive index at an F line (a wavelength of 486.1 nm) is set to nF, and a refractive index at a C line (a wavelength of 656.3 nm) is set to nC.

$$\theta gF=(ng-nF)/(nF-nC)$$

In addition, the height of a paraxial on-axis light ray is based on a definition in paraxial light ray tracing according to Expressions (2.10) to (2.12), pp. 19 of "Optical Technology Series 1 Lens Design Method" (authored by Yoshiya Matsui, Kyoritsu Shuppan Co., Ltd.).

According to the present invention, there is provided an imaging lens in which a plurality of lenses are combined with each other, including at least one negative lens that satisfies the following Conditional Expressions (1) to (3) in a case where a refractive index at a d line of a negative lens included in the imaging lens is set to nN, an Abbe number at the d line of the negative lens is set to νN, and a rate of change of the refractive index at the d line of the negative lens with respect to a change in temperature at 25° C. is set to dnN/dt, wherein a positive lens having a largest Abbe number at the d line among positive lenses included in the imaging lens satisfies the following Conditional Expressions (4) and (5) in a case where an Abbe number at the d line of the positive lens having a largest Abbe number at the d line is set to νP1, and a partial dispersion ratio of the positive lens having a largest Abbe number at the d line is set to θP1gF. Therefore, it is possible to provide an imaging lens in which various aberrations such as chromatic aberration and field curvature are satisfactorily corrected while satisfactorily correcting defocusing due to a change in temperature, and an optical apparatus including this imaging lens.

$$1.65<nN<1.75 \tag{1}$$

$$45<\nu N<55 \tag{2}$$

$$dnN/dt<0\times10^{-6}/°\text{ C.} \tag{3}$$

$$63<\nu P1 \tag{4}$$

$$0.644<\theta P1gF+0.001618\times\nu P1 \tag{5}$$

DESCRIPTION OF THE PREFERRED EMBODIMENTS

Figure 1:
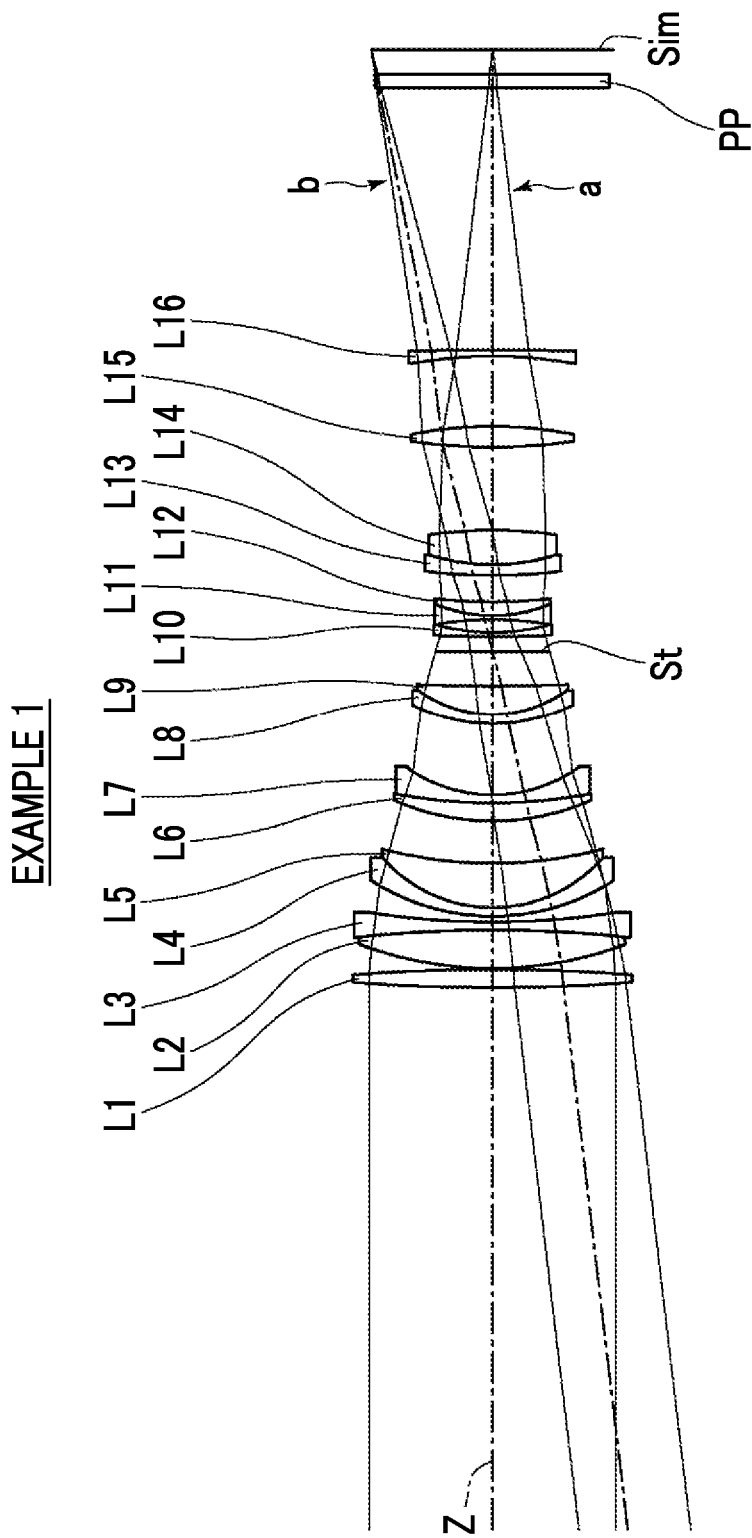
FIG. 1 is a cross-sectional view illustrating a lens configuration of an imaging lens (in common with that of Example 1) according to an embodiment of the present invention.

Hereinafter, an embodiment of the present invention will be described in detail with reference to the accompanying drawings. FIG. 1 is a cross-sectional view illustrating a lens configuration of an imaging lens according to an embodiment of the present invention. The configuration example shown in FIG. 1 is in common with the configuration of an imaging lens of Example 1 described later. In FIG. 1, the left side is an object side, the right side is an image side, and a shown aperture stop St shows its position on the optical axis Z without necessarily indicating its size or shape. In addition, FIG. 1 shows a state of being focused on the infinite object, and shows an on-axis light flux a and a light flux b of the maximum angle of view together.

Meanwhile, in a case where the imaging lens is mounted in an optical apparatus, it is preferable to include various types of filters and/or protective cover glass according to the specification of the optical apparatus. Thus, in FIG. 1, an example is shown in which a plane parallel plate-like optical member PP oriented to these components is disposed between a lens system and an image surface Sim. However, the position of the optical member PP is not limited to that shown in FIG. 1, and a configuration can also be used in which the optical member PP is omitted.

According to the present embodiment, there is provided an imaging lens in which a plurality of lenses are combined with each other, including at least one negative lens that satisfies the following Conditional Expressions (1) to (3) in a case where a refractive index at a d line of a negative lens included in the imaging lens is set to nN, an Abbe number at the d line of the negative lens is set to vN, and a rate of change of the refractive index at the d line of the negative lens with respect to a change in temperature at 25° C. is set to dnN/dt, wherein a positive lens having a largest Abbe number at the d line among positive lenses included in the imaging lens satisfies the following Conditional Expressions (4) and (5) in a case where an Abbe number at the d line of the positive lens having a largest Abbe number at the d line is set to vP1, and a partial dispersion ratio of the positive lens having a largest Abbe number at the d line is set to θP1gF.

$$1.65 < nN < 1.75 \tag{1}$$

$$45 < vN < 55 \tag{2}$$

$$dnN/dt < 0 \times 10^{-6}/°\ C. \tag{3}$$

$$63 < vP1 \tag{4}$$

$$0.644 < \theta P1gF + 0.001618 \times vP1 \tag{5}$$

Conditional Expressions (1) to (3) are conditions for satisfactorily correcting defocusing with a change in temperature even in a case where a material having large abnormal dispersibility is used in a positive lens. The negative lens that satisfies Conditional Expressions (1) to (3) refers to a negative lens in which dispersion is relatively low and refractive index is high while having a negative rate of change of the refractive index, and can correct a direction in which a focus position during a rise in temperature is shortened. Since a lot of optical materials have a positive rate of change of the refractive index, the negative lens that satisfies Conditional Expressions (1) to (3) and a lens formed of other general optical materials are combined with each other, and thus it is possible to satisfactorily correct chromatic aberration and defocusing due to a change in temperature.

In addition, a positive lens having a largest Abbe number at the d line among positive lenses included in the imaging lens is made to satisfy Conditional Expressions (4) and (5), and thus it is possible to make a design in which chromatic aberration is suppressed. Further, it is possible to correct defocusing with a change in temperature while suppressing field curvature and chromatic aberration by combination with the negative lens that satisfies Conditional Expressions (1) to (3).

The value (nN) is not set to be equal to or less than the lower limit of Conditional Expression (1), and thus it is possible to prevent the refractive index from excessively decreasing, which leads to the advantage of the correction of field curvature. The value (nN) is not set to be equal to or greater than the upper limit of Conditional Expression (1), and thus it is possible to prevent the refractive index from excessively increasing, and to secure an Abbe number required for chromatic aberration correction. Meanwhile, in a case where Conditional Expression (1-1) is satisfied, it is possible to make characteristics more satisfactory.

$$1.69 < nN < 1.71 \tag{1-1}$$

The value (vN) is not set to be equal to or less than the lower limit of Conditional Expression (2), which leads to the advantage of the correction of lateral chromatic aberration and on-axis chromatic aberration. The value (vN) is not set to be equal to or greater than the upper limit of Conditional Expression (2), which leads to the advantage of both the chromatic aberration correction and the refractive index. Meanwhile, in a case where Conditional Expression (2-1) is satisfied, it is possible to make characteristics more satisfactory.

$$50 < vN < 52 \tag{2-1}$$

The value (dnN/dt) is not set to be equal to or less than the lower limit of Conditional Expression (3), and thus it is possible to prevent a change in refractive index with respect to a change in temperature from excessively increasing, and to prevent the correction of defocusing from being in excess. The value (dnN/dt) is not set to be equal to or greater than the upper limit of Conditional Expression (3), and thus it is possible to prevent a change in refractive index with respect to a change in temperature from excessively decreasing, and to prevent the correction of defocusing from being in deficiency. Meanwhile, in a case where Conditional Expression (3-1) is satisfied, it is possible to make characteristics more satisfactory.

$$-2 \times 10^{-6}/°C. < dnN/dt < -1 \times 10^{-6}/°C. \tag{3-1}$$

The value (vP1) is not set to be equal to or less than the lower limit of Conditional Expression (4), which leads to the advantage of the correction of lateral chromatic aberration. The value (vP1) is not set to be equal to or greater than the upper limit of Conditional Expression (4), and thus it is possible to prevent the refractive index from excessively decreasing, which leads to the advantage of the correction of spherical aberration. Meanwhile, in a case where Conditional Expression (4-1) is satisfied, it is possible to make characteristics more satisfactory.

$$75 < vP1 < 100 \tag{4-1}$$

The value (θP1gF+0.001618×vP1) is not set to be equal to or less than the lower limit of Conditional Expression (5), and thus it is possible to prevent abnormal dispersibility from excessively decreasing, which leads to the facilitation of the correction of a secondary spectrum. The value (θP1gF+0.001618×vP1) is not set to be equal to or greater than the upper limit of Conditional Expression (5), and thus it is possible to prevent the refractive index from excessively decreasing, which leads to the advantage of the correction of spherical aberration. Meanwhile, in a case where Conditional Expression (5-1) is satisfied, it is possible to make characteristics more satisfactory.

$$0.665 < \theta P1gF + 0.001618 \times vP1 < 0.7 \tag{5-1}$$

In the imaging lens of the present embodiment, it is preferable that at least one negative lens among negative lenses that satisfy Conditional Expressions (1) to (3) satisfies the following Conditional Expression (6) in a case where a focal length of the negative lens is set to fN, and a focal length of the whole system during focusing on an infinite object is set to f. The value (|fN|/f) is not set to be equal to or greater than the upper limit of Conditional Expression (6), and thus it is possible to prevent the refractive power of the negative lens that satisfies Conditional Expressions (1) to (3) from becoming excessively weak, and to prevent a temperature correction effect from excessively decreasing. Meanwhile, in a case where Conditional Expression (6-1) is satisfied, it is possible to make characteristics more satisfactory. The value (|fN|/f) is not set to be equal to or less than the lower limit of Conditional Expression (6), and thus it is possible to prevent the refractive power of the negative lens that satisfies Conditional Expressions (1) to (3) from becoming excessively strong, and to prevent the temperature correction effect from excessively increasing.

$$|fN|/f < 10 \tag{6}$$

$$0.5 < |fN|/f < 5 \tag{6-1}$$

In addition, it is preferable to include at least one positive lens that satisfies the following Conditional Expressions (7) to (9) in a case where a refractive index at the d line of a positive lens included in the imaging lens is set to nP2, an Abbe number at the d line of the positive lens is set to vP2, and a rate of change of the refractive index at the d line of the positive lens with respect to a change in temperature at 25° C. is set to dnP2/dt.

$$1.6 < nP2 < 1.85 \tag{7}$$

$$40 < vP2 < 60 \tag{8}$$

$$6 \times 10^{-6}/°C. < dnP2/dt \tag{9}$$

Conditional Expressions (7) to (9) are conditions for enabling a lens system to suppress chromatic aberration and spherical aberration while correcting a change in focus with respect to a change in temperature. It is possible to correct a direction in which a focus position during a rise in temperature is shortened by disposing the positive lens that satisfies Conditional Expressions (7) to (9), that is, a lens formed of a material having a large value with a positive change in refractive index with respect to a change in temperature.

The value (nP2) is not set to be equal to or less than the lower limit of Conditional Expression (7), and thus it is possible to prevent the refractive index from excessively decreasing, which leads to the advantage of the correction of spherical aberration. The value (nP2) is not set to be equal to or greater than the upper limit of Conditional Expression (7), and thus it is possible to prevent the refractive index from excessively increasing, and to secure an Abbe number required for chromatic aberration correction. Meanwhile, in a case where Conditional Expression (7-1) is satisfied, it is possible to make characteristics more satisfactory.

$$1.65 < nP2 < 1.8 \tag{7-1}$$

The value (vP2) is not set to be equal to or less than the lower limit of Conditional Expression (8), which leads to the advantage of the correction of lateral chromatic aberration and on-axis chromatic aberration. The value (vP2) is not set to be equal to or greater than the upper limit of Conditional Expression (8), which leads to the advantage of both the chromatic aberration correction and the refractive index. Meanwhile, in a case where Conditional Expression (8-1) is satisfied, it is possible to make characteristics more satisfactory.

$$42 < vP2 < 57 \tag{8-1}$$

The value (dnP2/dt) is not set to be equal to or less than the lower limit of Conditional Expression (9), and thus it is possible to prevent a change in refractive index with respect to a change in temperature from excessively decreasing, and to prevent the correction of defocusing from being in deficiency. The value (dnP2/dt) is not set to be equal to or greater than the upper limit of Conditional Expression (9), and thus it is possible to prevent a change in refractive index with respect to a change in temperature from excessively increasing, and to prevent the correction of defocusing from being in excess. Meanwhile, in a case where Conditional Expression (9-1) is satisfied, it is possible to make characteristics more satisfactory.

$$6.5 \times 10^{-6}/°C < dnP2/dt < 11 \times 10^{-6}/°C. \tag{9-1}$$

In addition, it is preferable that the positive lens that satisfies Conditional Expressions (7) to (9) satisfies the following Conditional Expression (10), in a case where a focal length of the positive lens is set to fP2, and a focal length of the whole system during focusing on an infinite object is set to f. The value (fP2/f) is not set to be equal to or less than the lower limit of Conditional Expression (10), and thus it is possible to prevent the refractive power of the positive lens from becoming excessively strong, and to prevent the temperature correction effect from excessively increasing. The value (fP2/f) is not set to be equal to or greater than the upper limit of Conditional Expression (10), and thus it is possible to prevent the refractive power of the positive lens from becoming excessively weak, and to prevent the temperature correction effect from excessively decreasing. Meanwhile, in a case where Conditional Expression (10-1) is satisfied, it is possible to make characteristics more satisfactory.

$$fP2/f < 15 \tag{10}$$

$$0.2 < fP2/f < 5 \tag{10-1}$$

In addition, the imaging lens may be a single-focus lens. In that case, it is preferable to satisfy the following Conditional Expression (11), and more preferable to satisfy the following Conditional Expression (11-1) in a case where a height of a paraxial on-axis light ray on an object-side surface of the negative lens that satisfies Conditional Expressions (1) to (3) is set to HN, and a maximum value of heights of a paraxial on-axis light ray on each lens surface of all lenses included in the imaging lens is set to Hmax. The value (|HN/Hmax|) is not set to be equal to or less than the lower limit of Conditional Expression (11), and thus it is possible to prevent the height of a paraxial on-axis light ray of the negative lens that satisfies Conditional Expressions (1) to (3) from becoming excessively small, and to prevent a correction effect with respect to a change in temperature from becoming excessively weak. Meanwhile, in a case where Conditional Expression (11-1) is satisfied, it is possible to make characteristics more satisfactory.

$$0.39 < |HN/H\max| \tag{11}$$

$$0.49 < |HN/H\max| < 1 \tag{11-1}$$

In addition, the imaging lens may have a zooming function. In that case, in a case where defocusing with a change in temperature is corrected throughout the entire zooming region, it is preferable to satisfy the following Conditional Expression (12) in a case where a height of a paraxial on-axis light ray at a telephoto end on an object-side surface of the negative lens that satisfies Conditional Expressions (1) to (3) is set to HNt, a height of a paraxial on-axis light ray at the telephoto end of a surface having a maximum height of a paraxial on-axis light ray at a wide-angle end on each lens surface of all lenses included in the imaging lens is set to Htwm, a height of a paraxial on-axis light ray at the wide-angle end on the object-side surface of the negative lens that satisfies Conditional Expressions (1) to (3) is set to HNw, and a maximum value of heights of a paraxial on-axis light ray at the wide-angle end on each lens surface of all lenses included in the imaging lens is set to Hwwm. The value (|(HNt/Htwm)/(HNw/Hwwm)|) is not set to be equal to or less than the lower limit of Conditional Expression (12), and thus it is possible to prevent the height of an on-axis light ray at the telephoto end from becoming excessively small, and to secure a correction effect on the telephoto end side. The value (|(HNt/Htwm)/(HNw/Hwwm)|) is not set to be equal to or greater than the upper limit of Conditional Expression (12), and thus it is possible to prevent the height of an on-axis light ray at the wide-angle end from becoming excessively small, and to secure a correction effect on the wide-angle end side. Meanwhile, in a case where Conditional Expression (12-1) is satisfied, it is possible to make characteristics more satisfactory.

$$|(HNt/Htwm)/(HNw/Hwwm)| < 1.8 \tag{12}$$

$$0.4 < |(HNt/Htwm)/(HNw/Hwwm)| < 1.5 \tag{12-1}$$

In addition, the imaging lens may have a zooming function. In that case, particularly, in a case where defocusing with a change in temperature at the telephoto end is corrected, it is preferable to satisfy the following Conditional Expression (13) in a case where a height of a paraxial on-axis light ray at a telephoto end on an object-side surface of the negative lens that satisfies Conditional Expressions (1) to (3) is set to HNt, a height of a paraxial on-axis light ray at the telephoto end of a surface having a maximum height of a paraxial on-axis light ray at a wide-angle end on each lens surface of all lenses included in the imaging lens is set to Htwm, a height of a paraxial on-axis light ray at the wide-angle end on the object-side surface of the negative lens that satisfies Conditional Expressions (1) to (3) is set to HNw, and a maximum value of heights of a paraxial on-axis light ray at the wide-angle end on each lens surface of all lenses included in the imaging lens is set to Hwwm. The value (|(HNt/Htwm)/(HNw/Hwwm)|) is not set to be equal to or less than the lower limit of Conditional Expression (13), and thus it is possible to prevent a difference between the heights of on-axis light rays at the wide-angle end and the telephoto end from excessively decreasing, and to prevent the correction of defocusing with a change in temperature at the telephoto end from being insufficient. Meanwhile, in a case where Conditional Expression (13-1) is satisfied, it is possible to make characteristics more satisfactory. The value (|(HNt/Htwm)/(HNw/Hwwm)|) is not set to be equal to or greater than the upper limit of Conditional Expression (13), and thus it is possible to prevent the difference between the heights of on-axis light rays at the wide-angle end and the telephoto end from excessively increasing, and to prevent the correction of defocusing with a change in temperature at the telephoto end from being in excess.

$$1.8 < |(HNt/Htwm)/(HNw/Hwwm)| \tag{13}$$

$$2 < |(HNt/Htwm)/(HNw/Hwwm)| < 50 \tag{13-1}$$

In addition, in the example shown in FIG. 1, an example is shown in which the optical member PP is disposed between the lens system and the image surface Sim, but instead of disposing various types of filters, such as a low-pass filter or a filter in which a specific wavelength region is cut, between the lens system and the image surface Sim, various types of filters described above may be disposed between respective lenses, or coating having the same actions as those of various types of filters may be performed on the lens surface of any of the lenses.

Next, numerical value examples of the imaging lens of the present invention will be described. First, an imaging lens of Example 1 will be described. FIG. 1 shows a cross-sectional view illustrating a lens configuration of the imaging lens of Example 1. In FIG. 1 and FIGS. 2 to 7 corresponding to Examples 2 to 7 described later, the left side is an object side, the right side is an image side, and a shown aperture stop St shows its position on the optical axis Z without necessarily indicating its size or shape. In addition, FIGS. 1 to 7 show a state of being focused on the infinite object, and show an on-axis light flux a and a light flux b of the maximum angle of view together.

The imaging lens of Example 1 is a single-focus lens, and is composed of sixteen lenses, that is, lenses L1 to L16 in order from the object side. In the imaging lens of Example 1, the lens L16 (its material is S-LAL20 manufactured by OHARA INC.) is a negative lens that satisfies Conditional Expressions (1) to (3), the lens L14 (its material is S-LAL54Q manufactured by OHARA INC.) is a positive lens that satisfies Conditional Expressions (7) to (9), and the lens L9 is a positive lens having a largest Abbe number at the d line among positive lenses included in the imaging lens.

Table 1 shows basic lens data of the imaging lens of Example 1, and Table 2 shows data relating to specifications. In the following, the meanings of symbols in the tables will be described by taking an example of those in Example 1, but the same is basically true of Examples 2 to 7.

In the lens data of Table 1, the column of a surface number shows surface numbers sequentially increasing toward the image surface side with the surface of an element closest to the object side regarded as a first surface and, the column of a curvature radius shows curvature radii of respective surfaces, and the column of a surface distance shows distances on the optical axis Z between the respective surfaces and the next surfaces. In addition, the column of n shows refractive indexes of respective optical elements at the d line (a wavelength of 587.6 nm (nanometer)), the column of ν shows Abbe numbers of the respective optical elements at the d line (a wavelength of 587.6 nm (nanometer)), the column of dn/dt shows rates of change in refractive index at the d line (a wavelength of 587.6 nm (nanometer)) with respect to a change in temperature at 25° C. of the respective optical elements, the column of θgF shows partial dispersion ratios of the respective optical elements, and the column of Conditional Expression (5) shows values of Conditional Expression (5) of the respective optical elements. Meanwhile, in Table 1, "×10$^{-6}$/° C." is omitted with respect to the values of dn/dt.

In addition, the sign of the curvature radius is set to be positive in a case where a surface shape is convex on the object side, and is set to be negative in a case where a surface shape is convex on the image surface side. Basic lens data indicates the aperture stop St and optical member PP together. In the place of a surface number of a surface equivalent to the aperture stop St, a term of (stop) is written together with the surface number.

The data relating to specifications of Table 2 shows values of a focal length f, a back focus Bf, an F-Number FNo., and the total angle of view 2ω[° ].

For the basic lens data and the data relating to specifications, a degree (°) is used as the unit of an angle, and mm (millimeter) is used as the unit of a length, but it is also possible to use other appropriate units since an optical system can be used even in a case where the optical system is magnified or reduced in proportion.

TABLE 1

EXAMPLE 1•LENS DATA (n AND ν ARE BASED ON d LINE)

| SURFACE NUMBER | CURVATURE RADIUS | SURFACE DISTANCE | n | ν | θgF | dn/dt | EXPRESSION (5) |
|---|---|---|---|---|---|---|---|
| 1 | 436.2065 | 4.3542 | 1.48749 | 70.24 | 0.53007 | −0.8 | 0.64372 |
| 2 | −436.2065 | 0.2438 | | | | | |
| 3 | 90.3149 | 9.1985 | 1.49700 | 81.54 | 0.53748 | −6.1 | 0.66941 |
| 4 | −303.0390 | 1.9496 | 1.65160 | 58.62 | 0.54102 | 3.1 | 0.63587 |
| 5 | 192.7307 | 1.3619 | | | | | |
| 6 | 53.2590 | 2.0706 | 1.51742 | 52.43 | 0.55649 | 2.4 | 0.64132 |
| 7 | 35.0424 | 10.6348 | 1.49700 | 81.54 | 0.53748 | −6.1 | 0.66941 |
| 8 | 103.2588 | 10.1387 | | | | | |
| 9 | 58.2805 | 4.3382 | 1.90366 | 31.31 | 0.59481 | 3.6 | 0.64547 |
| 10 | 125.5233 | 1.9418 | 1.80610 | 40.93 | 0.57019 | 7 | 0.63641 |
| 11 | 35.6304 | 16.9295 | | | | | |
| 12 | 42.8907 | 2.2673 | 1.56732 | 42.82 | 0.57309 | 2.9 | 0.64237 |
| 13 | 30.2253 | 6.8840 | 1.43875 | 94.66 | 0.53402 | −6.2 | 0.68718 |
| 14 | 438.6286 | 8.2402 | | | | | |
| 15(STOP) | ∞ | 3.6368 | | | | | |
| 16 | 357.1219 | 1.0199 | 1.85150 | 40.78 | 0.56958 | 5.4 | 0.63556 |
| 17 | 50.0030 | 3.1226 | | | | | |
| 18 | −78.3563 | 0.9580 | 1.72916 | 54.09 | 0.54490 | 4.9 | 0.63242 |
| 19 | 35.9157 | 3.2645 | 1.84666 | 23.78 | 0.62054 | 1.4 | 0.65902 |
| 20 | 118.8928 | 6.3200 | | | | | |
| 21 | 122.1512 | 2.6266 | 1.89286 | 20.36 | 0.63944 | 1.1 | 0.67238 |
| 22 | 50.0834 | 8.2404 | 1.65100 | 56.24 | 0.54210 | 6.6 | 0.63310 |
| 23 | −108.8489 | 19.9574 | | | | | |
| 24 | 135.4182 | 5.0025 | 1.62588 | 35.70 | 0.58935 | 2.7 | 0.64711 |
| 25 | −95.7474 | 16.7689 | | | | | |
| 26 | −108.9483 | 1.4930 | 1.69930 | 51.11 | 0.55523 | −1.2 | 0.63793 |
| 27 | −787.3933 | 62.9700 | | | | | |
| 28 | ∞ | 3.2000 | 1.51680 | 64.20 | 0.53430 | | |
| 29 | ∞ | 5.8797 | | | | | |

TABLE 2

EXAMPLE 1•SPECIFICATION (d LINE)

| | |
|---|---|
| f | 242.52 |
| Bf | 70.96 |
| FNo. | 4.12 |
| 2ω[°] | 13.4 |

Figure 8:
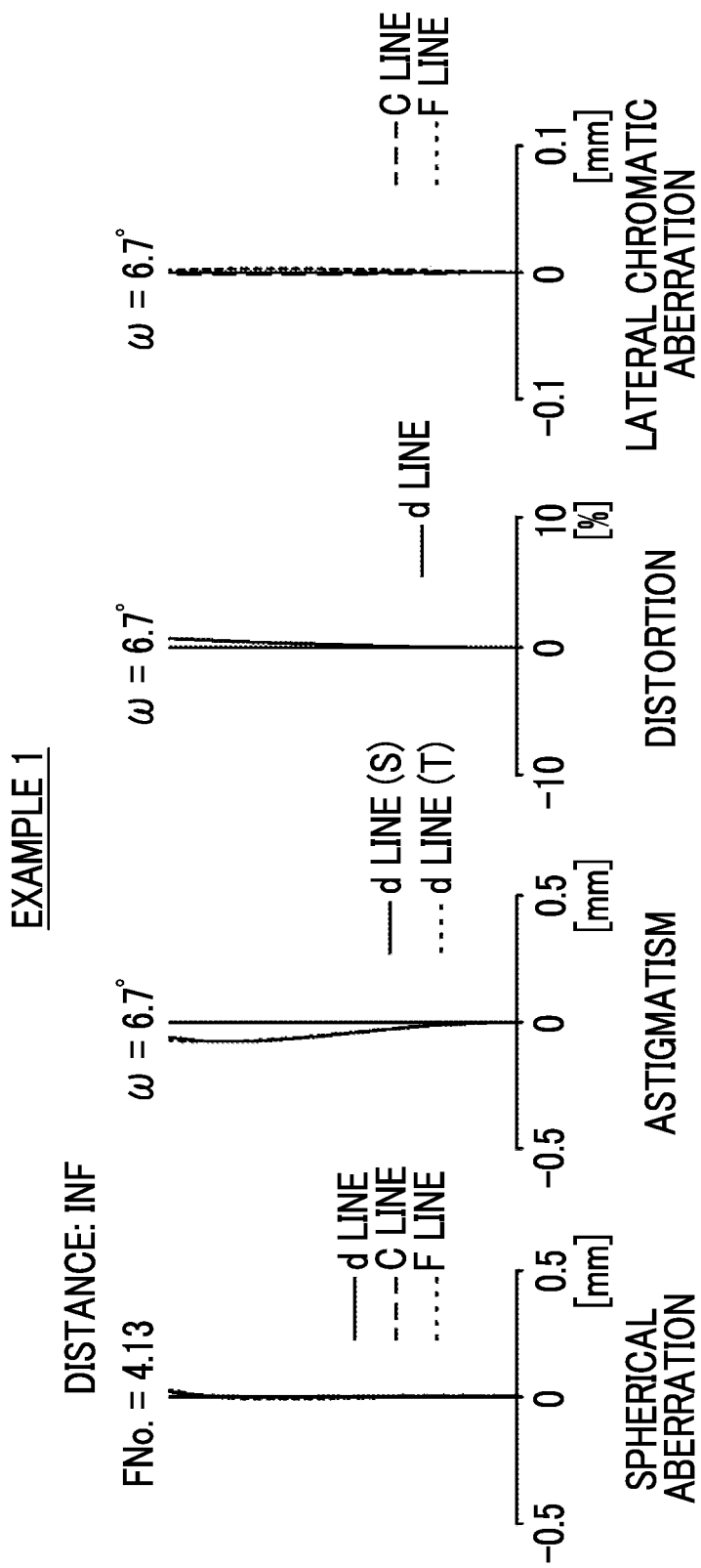
FIG. 8 is a diagram of aberrations of the imaging lens of Example 1 of the present invention.

FIG. 8 shows a diagram of aberrations of the imaging lens of Example 1. Meanwhile, spherical aberration, astigmatism, distortion, and lateral chromatic aberration are shown in order from the left side in FIG. 8. The diagram of aberrations indicating spherical aberration, astigmatism, and distortion shows aberrations in which the d line (a wavelength of 587.6 nm (nanometer)) is used as a reference wavelength. In the spherical aberration diagram, aberrations relating to the d line (a wavelength of 587.6 nm (nanometer)), a C line (a wavelength of 656.3 nm (nanometer)), and an F line (a wavelength of 486.1 nm (nanometer)) are shown by a solid line, a long dashed line, and a short dashed line. In the astigmatism diagram, aberrations in a sagittal direction and a tangential direction are shown by a solid line and a short dashed line, respectively. In the lateral chromatic aberration diagram, aberrations relating to the C line (a wavelength of 656.3 nm (nanometer)) and the F line (a wavelength of 486.1 nm (nanometer)) are shown by a long dashed line and a short dashed line, respectively. Meanwhile, FNo. in the spherical aberration diagram means an F-Number, and w in the other aberration diagrams means a half angle of view.

Figure 2:
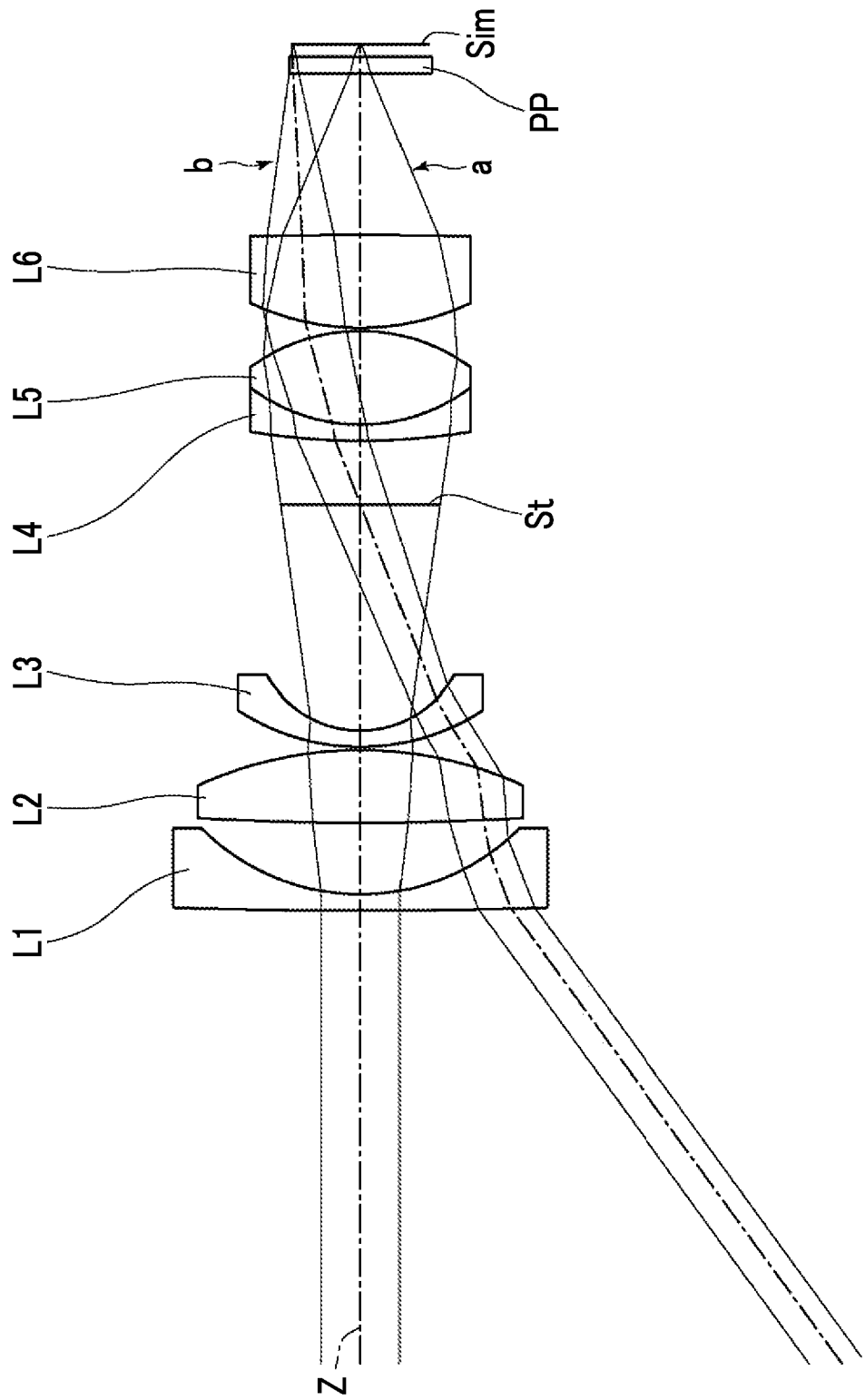
FIG. 2 is a cross-sectional view illustrating a lens configuration of an imaging lens of Example 2 of the present invention.
Figure 9:
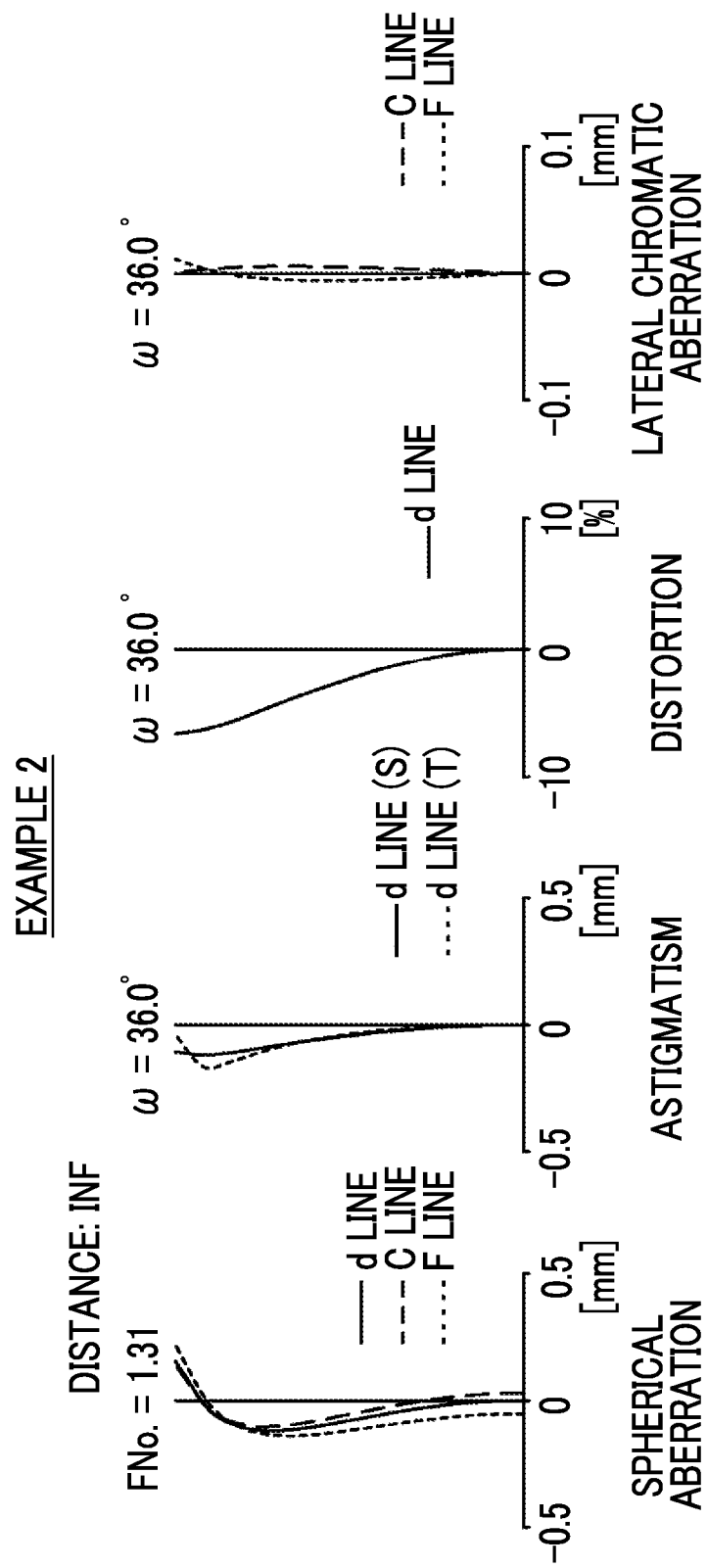
FIG. 9 is a diagram of aberrations of the imaging lens of Example 2 of the present invention.

Next, an imaging lens of Example 2 will be described. FIG. 2 shows a cross-sectional view illustrating a lens configuration of the imaging lens of Example 2. The imaging lens of Example 2 is a single-focus lens, and is composed of six lenses, that is, lenses L1 to L6 in order from the object side. In the imaging lens of Example 2, the lens L1 (its material is S-LAL20 manufactured by OHARA INC.) is a negative lens that satisfies Conditional Expressions (1) to (3), the lens L6 (its material is S-LAH52Q manufactured by OHARA INC.) is a positive lens that satisfies Conditional Expressions (7) to (9), and the lens L5 is a positive lens having a largest Abbe number at the d line among positive lenses included in the imaging lens. In addition, Table 3 shows basic lens data of the imaging lens of Example 2, Table 4 shows data relating to specifications, and FIG. 9 shows a diagram of aberrations.

Figure 3:
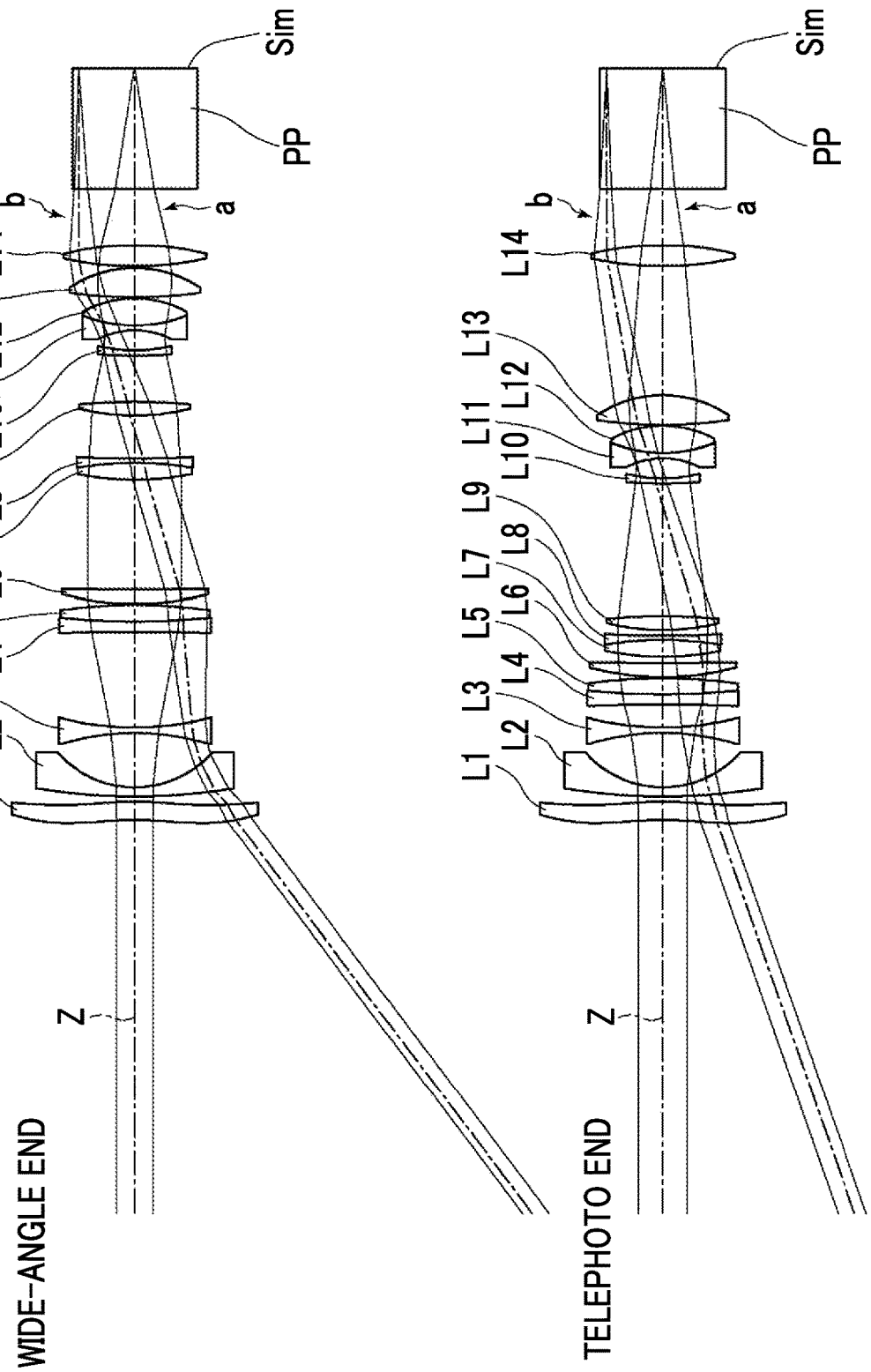
FIG. 3 is a cross-sectional view illustrating a lens configuration of an imaging lens of Example 3 of the present invention.
Figure 10:
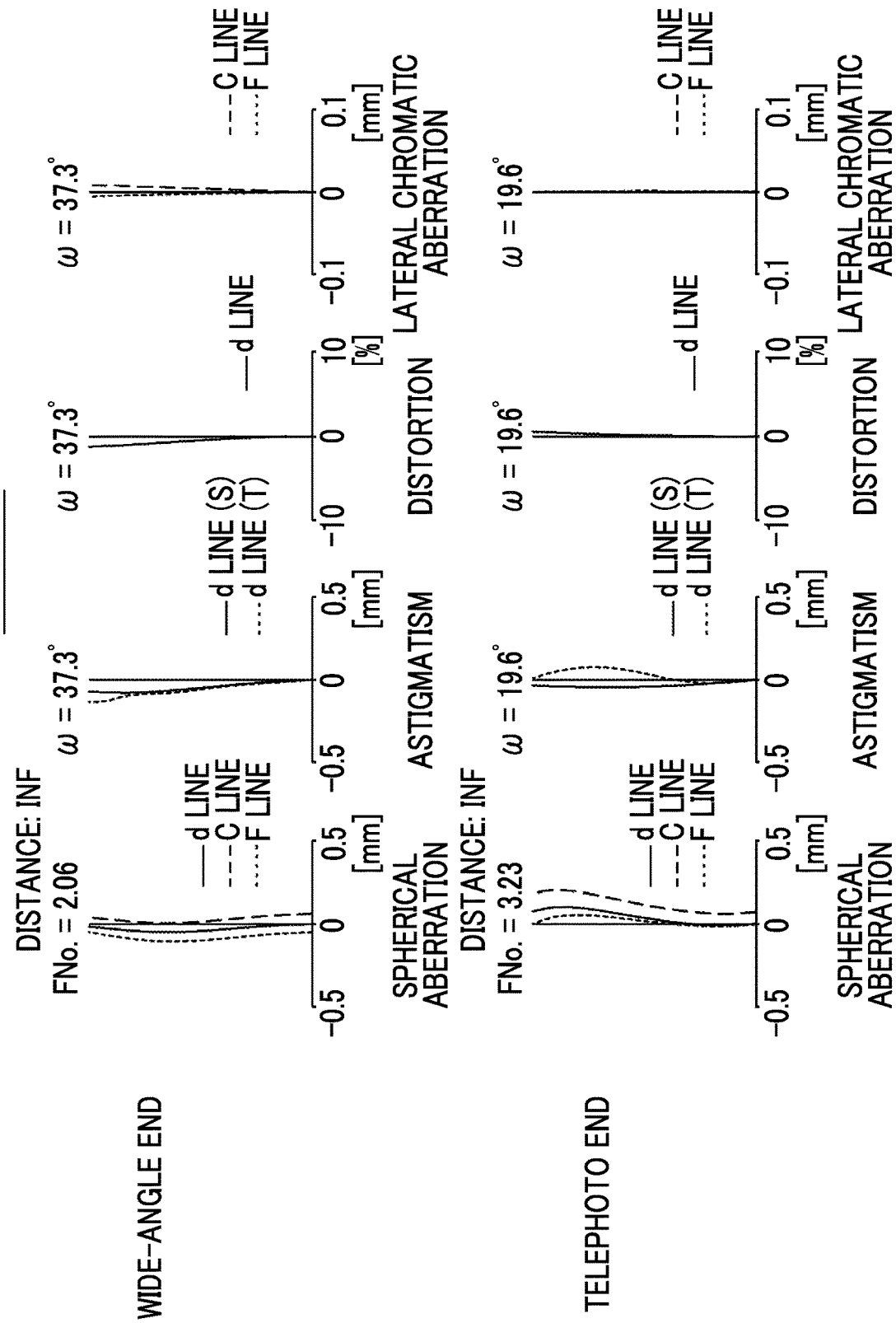
FIG. 10 is a diagram of aberrations of the imaging lens of Example 3 of the present invention.

Next, an imaging lens of Example 3 will be described. FIG. 3 shows a cross-sectional view illustrating a lens configuration of the imaging lens of Example 3. The imaging lens of Example 3 has a zooming function, and is composed of fourteen lenses, that is, lenses L1 to L14 in order from the object side. In the imaging lens of Example 3, the lens L2 (its material is S-LAL20 manufactured by OHARA INC.) is a negative lens that satisfies Conditional Expressions (1) to (3), the lens L5 (its material is S-LAH52Q manufactured by OHARA INC.) and the lens L7 (its material is S-LAL54Q manufactured by OHARA INC.) are positive lenses that satisfy Conditional Expressions (7) to (9), and the lens L3 is a positive lens having a largest Abbe number at the d line among positive lenses included in the imaging lens. In addition, Table 5 shows basic lens data of the imaging lens of Example 3, Table 6 shows data relating to specifications, Table 7 shows data relating to changing surface distances, Table 8 shows data relating to aspherical coefficients, and FIG. 10 shows a diagram of aberrations.

The data relating to specifications of Table 6 shows values of a zoom magnification, a focal length f, a back focus Bf, an F-Number FNo., and the total angle of view $2\omega[°]$ with respect to each of the wide-angle end and the telephoto end.

In the lens data of Table 5, DD [surface number] is written in the places of surface distances having a change in distance during zooming. Numerical values corresponding to DD [surface number] are shown in Table 7.

In the lens data of Table 8, mark * is attached to the surface number of an aspherical surface, and the numerical values of a paraxial curvature radius are indicated as the curvature radius of the aspherical surface. The data relating to the aspherical coefficients of Table 8 indicates surface numbers of the aspherical surfaces and aspherical coefficients relating to these aspherical surfaces. "E±n" (n is an integer) in the numerical values of the aspherical coefficients of Table 8 means "×10$^{±n}$". The aspherical coefficients are values of respective coefficients KA and Am in an aspherical expression represented by the following expression.

$$Zd = C \cdot h^2 / \{1 + (1 - KA \cdot C^2 \cdot h^2)^{1/2}\} + \Sigma Am \cdot h^m$$

Here, Zd is an aspherical depth (length of a vertical line drawn from a point on an aspherical surface having a height h down to a plane perpendicular to the optical axis with which the vertex of the aspherical surface is in contact),

TABLE 3

EXAMPLE 2·LENS DATA (n AND ν ARE BASED ON d LINE)

| SURFACE NUMBER | CURVATURE RADIUS | SURFACE DISTANCE | n | ν | θgF | dn/dt | EXPRESSION (5) |
|---|---|---|---|---|---|---|---|
| 1 | 373.3289 | 0.9998 | 1.69930 | 51.11 | 0.55523 | −1.2 | 0.63793 |
| 2 | 13.7465 | 4.4135 | | | | | |
| 3 | 173.0372 | 4.4821 | 1.84666 | 23.78 | 0.62054 | 1.4 | 0.65902 |
| 4 | −23.8724 | 0.1998 | | | | | |
| 5 | 13.6968 | 0.9998 | 1.48749 | 70.24 | 0.53007 | −0.7 | 0.64372 |
| 6 | 6.5504 | 13.9171 | | | | | |
| 7(STOP) | ∞ | 3.9257 | | | | | |
| 8 | 40.6043 | 0.9998 | 1.84666 | 23.78 | 0.62054 | 1.4 | 0.65902 |
| 9 | 11.0954 | 5.7718 | 1.49700 | 81.54 | 0.53748 | −6.1 | 0.66941 |
| 10 | −11.2802 | 0.1998 | | | | | |
| 11 | 15.6608 | 5.7220 | 1.79952 | 42.24 | 0.56758 | 10.2 | 0.63592 |
| 12 | −251.4968 | 10.0000 | | | | | |
| 13 | ∞ | 1.0000 | 1.51680 | 64.20 | 0.53430 | | |
| 14 | ∞ | 0.7616 | | | | | |

TABLE 4

EXAMPLE 2·SPECIFICATION (d LINE)

| | |
|---|---|
| f | 6.20 |
| Bf | 11.42 |
| FNo. | 1.30 |
| 2ω[°] | 72.0 | h is a height (distance from the optical axis),
C is a reciprocal of the paraxial curvature radius, and
KA and Am are aspherical coefficients.
Σ at an aspherical depth Zd means a total sum for m.

In addition, in the diagram of aberrations of FIG. 10, a diagram of aberrations at the wide-angle end is shown on the upper portion, and a diagram of aberrations at the telephoto end is shown on the lower portion.

Meanwhile, the meanings of data relating to specifications, data relating to changing surface distances, data relating to aspherical coefficients, and symbols in a diagram of aberrations will be described by taking an example of those in Example 3, but the same is basically true of Examples 4 to 7.

TABLE 5

EXAMPLE 3•LENS DATA (n AND ν ARE BASED ON d LINE)

| SURFACE NUMBER | CURVATURE RADIUS | SURFACE DISTANCE | n | ν | θgF | dn/dt | EXPRESSION (5) |
|---|---|---|---|---|---|---|---|
| *1 | −86.8543 | 5.4000 | 1.49100 | 57.58 | 0.56866 | −118.7 | 0.66182 |
| *2 | −91.5913 | 1.5002 | | | | | |
| 3 | 187.3568 | 2.6626 | 1.69930 | 51.11 | 0.55523 | −1.2 | 0.63793 |
| 4 | 31.3583 | 16.0871 | | | | | |
| 5 | −76.1939 | 1.6495 | 1.49700 | 81.61 | 0.53887 | −6.4 | 0.67091 |
| 6 | 90.6936 | DD[6] | | | | | |
| 7 | −623.5670 | 3.0094 | 1.59270 | 35.31 | 0.59336 | 0.1 | 0.65049 |
| 8 | 234.2998 | 4.8231 | 1.79952 | 42.24 | 0.56758 | 10.2 | 0.63592 |
| 9 | −157.3778 | 0.2997 | | | | | |
| 10 | 86.8900 | 4.2023 | 1.83400 | 37.16 | 0.57759 | 7.7 | 0.63771 |
| 11 | 1187.0706 | DD[11] | | | | | |
| 12 | 88.9944 | 4.9804 | 1.65100 | 56.24 | 0.54210 | 6.6 | 0.63310 |
| 13 | −107.6741 | 1.3491 | 1.80000 | 29.84 | 0.60178 | 4.4 | 0.65006 |
| 14 | 377.3119 | DD[14] | | | | | |
| 15 | 70.2400 | 4.0253 | 1.57135 | 52.95 | 0.55544 | −0.5 | 0.64111 |
| 16 | −185.5424 | DD[16] | | | | | |
| *17 | 150.7223 | 1.5000 | 1.80610 | 40.88 | 0.56889 | 0 | 0.63503 |
| *18 | 44.5626 | 5.9329 | | | | | |
| 19 | −24.4333 | 1.5655 | 1.72151 | 29.23 | 0.60541 | 2.6 | 0.65270 |
| 20 | 41.3753 | 8.0139 | 1.49700 | 81.61 | 0.53887 | −6.4 | 0.67091 |
| 21 | −33.1564 | 0.2991 | | | | | |
| 22 | 141.0514 | 8.7428 | 1.59270 | 35.31 | 0.59336 | 0.1 | 0.65049 |
| 23 | −36.0156 | DD[23] | | | | | |
| 24 | 101.7173 | 6.2570 | 1.49700 | 81.61 | 0.53887 | −6.4 | 0.67091 |
| 25 | −88.0449 | 16.8000 | | | | | |
| 26 | ∞ | 35.5400 | 1.51633 | 64.14 | 0.53531 | | |
| 27 | ∞ | 0.0270 | | | | | |

TABLE 6

EXAMPLE 3•SPECIFICATION (d LINE)

| | WIDE-ANGLE END | TELEPHOTO END |
|---|---|---|
| ZOOM MAGNIFICATION | 1.0 | 2.1 |
| f | 22.42 | 47.07 |
| Bf | 40.3 | 40.3 |
| FNo. | 2.05 | 3.22 |
| 2ω[°] | 74.6 | 39.2 |

TABLE 7

EXAMPLE 3 VARIABLE SURFACE DISTANCE

| | WIDE-ANGLE END | TELEPHOTO END |
|---|---|---|
| DD[6] | 28.31 | 6.74 |
| DD[11] | 32.46 | 1.85 |

TABLE 7-continued

EXAMPLE 3 VARIABLE SURFACE DISTANCE

| | WIDE-ANGLE END | TELEPHOTO END |
|---|---|---|
| DD[14] | 12.66 | 1.59 |
| DD[16] | 13.65 | 39.14 |
| DD[23] | 0.50 | 38.26 |

TABLE 8

EXAMPLE 3 ASPHERICAL COEFFICIENT

| SURFACE NUMBER | 1 | 2 |
|---|---|---|
| KA | −6.1271449E+00 | −8.5150005E+00 |
| A3 | −5.2066671E−05 | −5.4765446E−05 |
| A4 | 2.0837597E−05 | 1.9900794E−05 |
| A5 | −6.8781461E−07 | −6.9765880E−07 |
| A6 | 6.5879516E−09 | 6.1544108E−09 |
| A7 | 8.7884315E−11 | 1.1446136E−10 |
| A8 | −1.6907823E−12 | −2.0639924E−12 |

| SURFACE NUMBER | 17 | 18 |
|---|---|---|
| KA | 1.0000000E+00 | 1.0000000E+00 |
| A4 | 3.5313538E−07 | 5.4249400E−06 |
| A6 | −1.1401863E−07 | −1.1945183E−07 |
| A8 | 4.5688395E−10 | 4.5868120E−10 |
| A10 | −7.9325572E−13 | −8.8476257E−13 |

Figure 4:
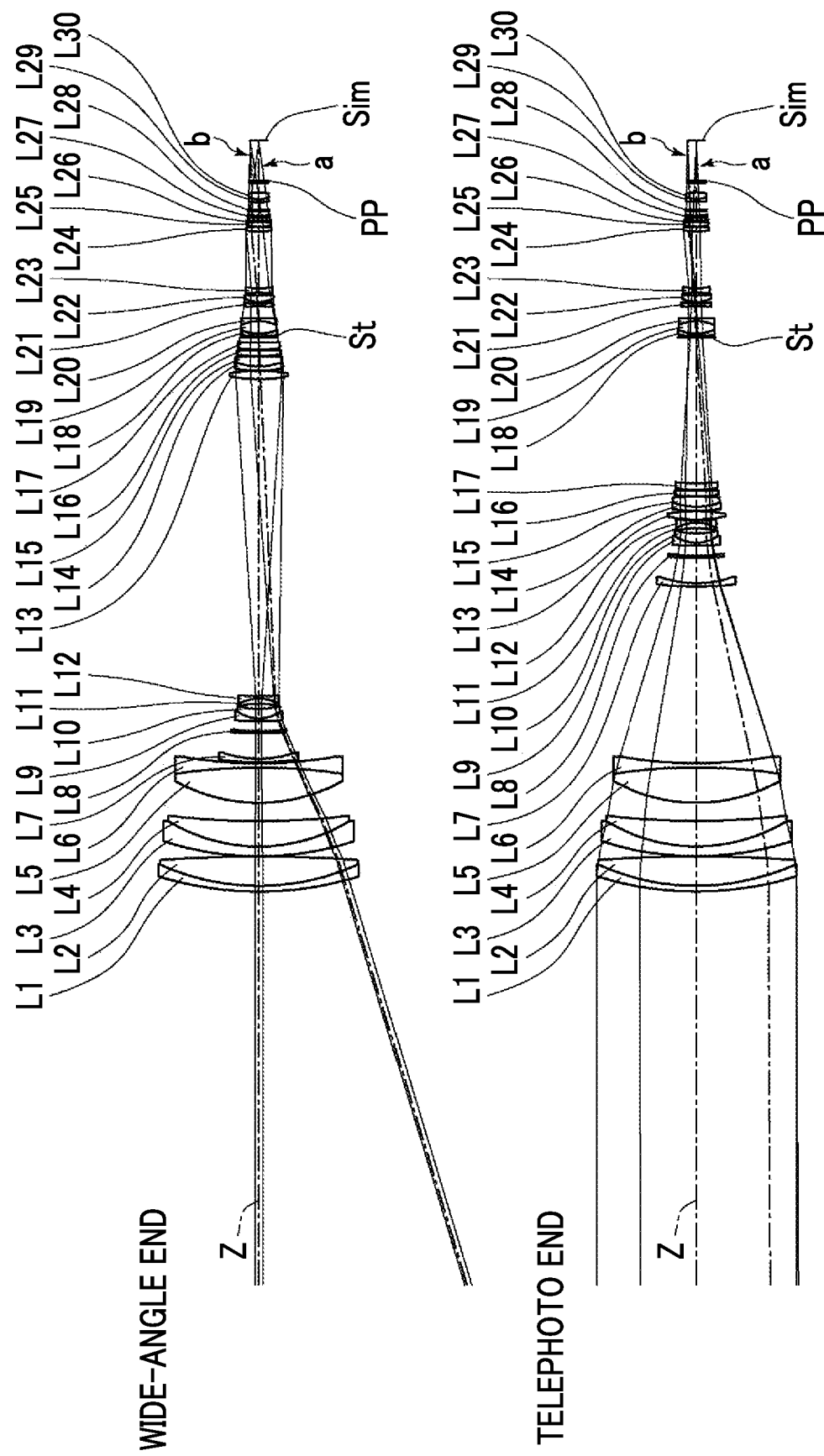
FIG. 4 is a cross-sectional view illustrating a lens configuration of an imaging lens of Example 4 of the present invention.
Figure 11:
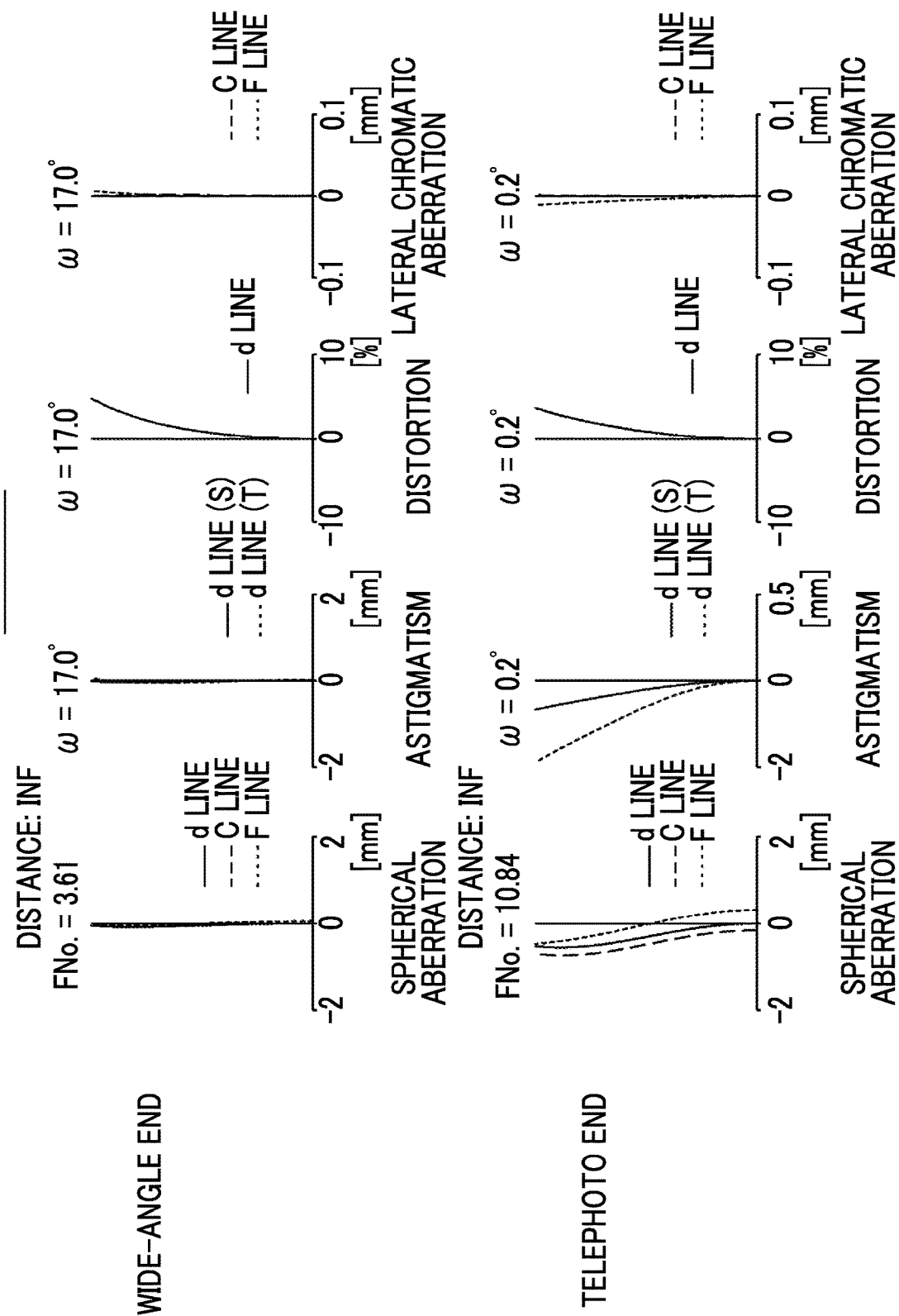
FIG. 11 is a diagram of aberrations of the imaging lens of Example 4 of the present invention.

Next, an imaging lens of Example 4 will be described. FIG. 4 shows a cross-sectional view illustrating a lens configuration of the imaging lens of Example 4. The imaging lens of Example 4 has a zooming function, and is composed of thirty lenses, that is, lenses L1 to L30 in order from the object side. In the imaging lens of Example 4, the lens L7 (its material is S-LAL20 manufactured by OHARA INC.) and the lens L26 (its material is S-LAL20 manufactured by OHARA INC.) are negative lenses that satisfy Conditional Expressions (1) to (3), and the lens L4 is a positive lens having a largest Abbe number at the d line among positive lenses included in the imaging lens. In addition, Table 9 shows basic lens data of the imaging lens of Example 4, Table 10 shows data relating to specifications, Table 11 shows data relating to changing surface distances, and FIG. 11 shows a diagram of aberrations.

TABLE 10

EXAMPLE 4•SPECIFICATION (d LINE)

|  | WIDE-ANGLE END | TELEPHOTO END |
|---|---|---|
| ZOOM MAGNIFICATION | 1.0 | 79.9 |
| f | 14.50 | 1158.68 |
| Bf | 26.8 | 26.8 |
| FNo. | 3.60 | 10.85 |
| 2ω[°] | 34.0 | 0.4 |

TABLE 9

EXAMPLE 4•LENS DATA (n AND ν ARE BASED ON d LINE)

| SURFACE NUMBER | CURVATURE RADIUS | SURFACE DISTANCE | n | ν | θgF | dn/dt | EXPRESSION (5) |
|---|---|---|---|---|---|---|---|
| 1 | 183.6355 | 3.0008 | 1.53996 | 59.46 | 0.54418 | 1.9 | 0.64039 |
| 2 | 130.3985 | 15.4290 | 1.49700 | 81.54 | 0.53748 | −6.1 | 0.66941 |
| 3 | −741.0428 | 0.1281 | | | | | |
| 4 | 167.9717 | 5.1458 | 1.83481 | 42.74 | 0.56490 | 5 | 0.63405 |
| 5 | 94.4302 | 13.3866 | 1.43875 | 94.66 | 0.53402 | −6.2 | 0.68718 |
| 6 | 421.4789 | 9.58 | | | | | |
| 7 | 92.6466 | 18.5702 | 1.43875 | 94.66 | 0.53402 | −6.2 | 0.68718 |
| 8 | −296.8343 | 2.2514 | 1.48749 | 70.24 | 0.53007 | −0.8 | 0.64372 |
| 9 | 247.1501 | DD[9] | | | | | |
| 10 | 184.9709 | 1.7844 | 1.69930 | 51.11 | 0.55523 | −1.2 | 0.63793 |
| 11 | 58.0940 | 13.2969 | | | | | |
| 12 | 161.3581 | 1.2105 | 1.74400 | 44.79 | 0.56560 | 3 | 0.63807 |
| 13 | 109.9764 | 5.5699 | | | | | |
| 14 | 1806.5468 | 1.2072 | 1.72916 | 54.68 | 0.54451 | 4.1 | 0.63298 |
| 15 | 19.9826 | 5.0049 | 1.80518 | 25.42 | 0.61616 | 1.2 | 0.65729 |
| 16 | 42.7748 | 2.6573 | | | | | |
| 17 | −51.4949 | 2.9795 | 1.80518 | 25.42 | 0.61616 | 1.2 | 0.65729 |
| 18 | −21.4215 | 1.2224 | 1.80400 | 46.53 | 0.55775 | 4.5 | 0.63304 |
| 19 | 140.2982 | DD[19] | | | | | |
| 20 | 77.7025 | 4.4019 | 1.49700 | 81.54 | 0.53748 | −6.1 | 0.66941 |
| 21 | −94.7999 | 0.1202 | | | | | |
| 22 | 81.0558 | 2.2718 | 1.95375 | 32.32 | 0.59015 | 4.8 | 0.64244 |
| 23 | 39.3973 | 5.2587 | 1.43875 | 94.66 | 0.53402 | −6.2 | 0.68718 |
| 24 | −171.9642 | 0.1203 | | | | | |
| 25 | 85.1990 | 2.9106 | 1.43875 | 94.66 | 0.53402 | −6.2 | 0.68718 |
| 26 | 960.9584 | 0.4677 | | | | | |
| 27 | 71.6415 | 3.5441 | 1.51633 | 64.14 | 0.53531 | 2.7 | 0.63909 |
| 28 | 126.8975 | DD[28] | | | | | |
| 29(STOP) | ∞ | 0.9463 | | | | | |
| 30 | 111.3980 | 1.2591 | 1.83481 | 42.74 | 0.56490 | 5 | 0.63405 |
| 31 | 25.5684 | 6.5211 | 1.51742 | 52.43 | 0.55649 | 2.4 | 0.64132 |
| 32 | −23.1807 | 1.5186 | 1.51633 | 64.14 | 0.53531 | 2.7 | 0.63909 |
| 33 | −1355.5219 | 6.3987 | | | | | |
| 34 | −84.8771 | 1.3351 | 1.51633 | 64.14 | 0.53531 | 2.7 | 0.63909 |
| 35 | 56.6825 | 0.8767 | | | | | |
| 36 | 19.5654 | 3.5002 | 1.66680 | 33.05 | 0.59578 | 1.7 | 0.64925 |
| 37 | 205.1287 | 1.2325 | | | | | |
| 38 | −70.4615 | 2.3862 | 1.83481 | 42.74 | 0.56490 | 5 | 0.63405 |
| 39 | 31.6981 | 30.0189 | | | | | |
| 40 | 37.0004 | 2.4074 | 1.68893 | 31.07 | 0.60041 | 2.6 | 0.65068 |
| 41 | −59.8776 | 0.1332 | | | | | |
| 42 | 29.5443 | 2.5805 | 1.49700 | 81.54 | 0.53748 | −6.1 | 0.66941 |
| 43 | −35.0484 | 0.8014 | 1.69930 | 51.11 | 0.55523 | −1.2 | 0.63793 |
| 44 | 169.2974 | 1.1583 | | | | | |
| 45 | 54.3737 | 1.2058 | 1.88300 | 40.76 | 0.56679 | 4.8 | 0.63274 |
| 46 | 26.9531 | 2.2959 | | | | | |
| 47 | ∞ | 1.0000 | 1.51680 | 64.20 | 0.53430 | 2.8 | 0.63818 |
| 48 | ∞ | 4.1002 | | | | | |
| 49 | 322.9618 | 1.2612 | 1.89190 | 37.13 | 0.57813 | 5.2 | 0.63821 |
| 50 | 12.2253 | 3.7481 | 1.49700 | 81.54 | 0.53748 | −6.1 | 0.66941 |
| 51 | −22.9978 | 5.0000 | | | | | |
| 52 | ∞ | 1.0000 | 1.51633 | 64.05 | 0.53463 | | |
| 53 | ∞ | 21.1467 | | | | | |

TABLE 11

EXAMPLE 4 VARIABLE SURFACE DISTANCE

|  | WIDE-ANGLE END | TELEPHOTO END |
|---|---|---|
| DD[9] | 0.56 | 92.61 |
| DD[19] | 166.38 | 0.40 |
| DD[28] | 2.67 | 76.60 |

Figure 5:
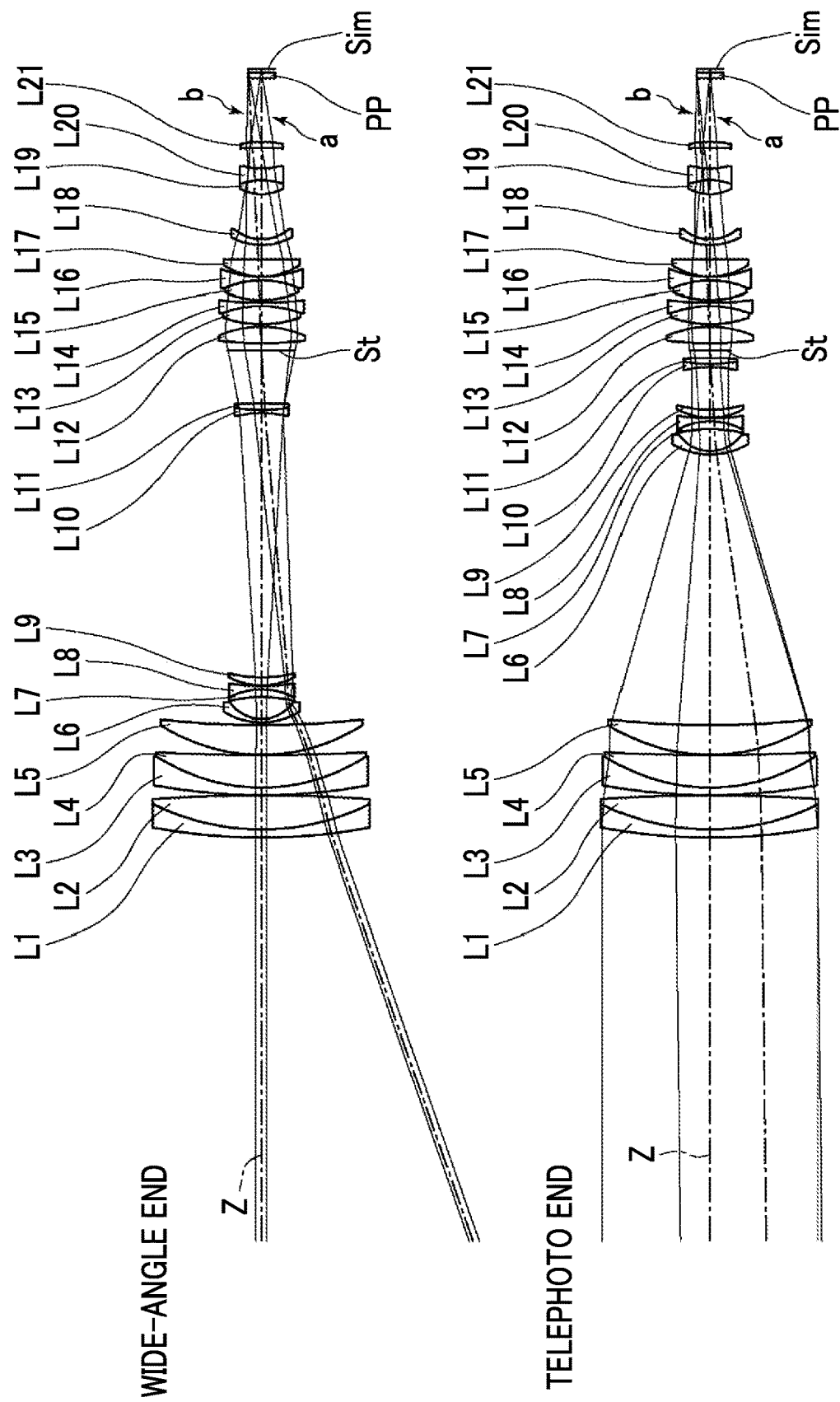
FIG. 5 is a cross-sectional view illustrating a lens configuration of an imaging lens of Example 5 of the present invention.
Figure 12:
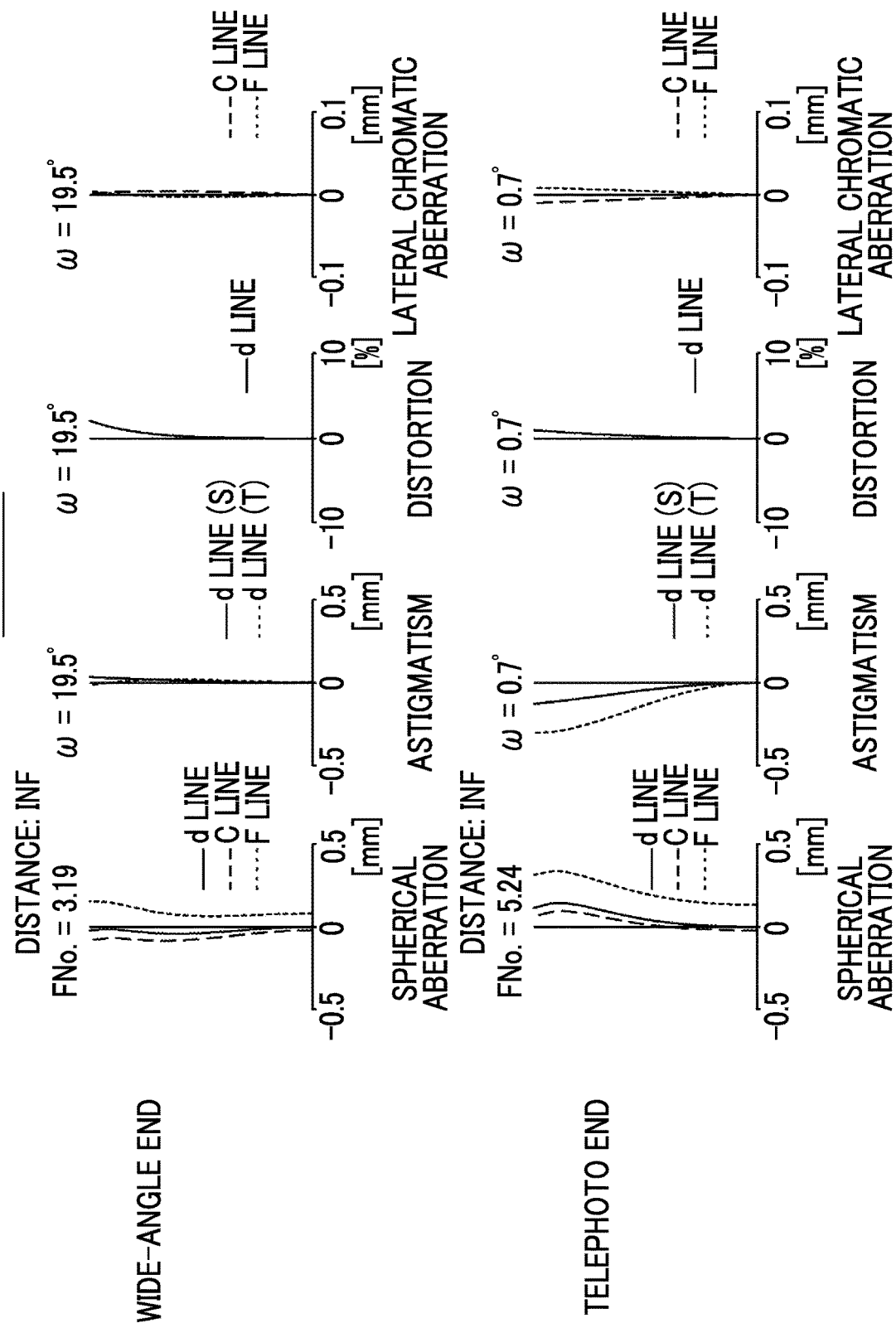
FIG. 12 is a diagram of aberrations of the imaging lens of Example 5 of the present invention.

Next, an imaging lens of Example 5 will be described. FIG. 5 shows a cross-sectional view illustrating a lens configuration of the imaging lens of Example 5. The imaging lens of Example 5 has a zooming function, and is composed of twenty-one lenses, that is, lenses L1 to L21 in order from the object side. In the imaging lens of Example 5, the lens L16 (its material is S-LAL20 manufactured by OHARA INC.) is a negative lens that satisfies Conditional Expressions (1) to (3), and the lens L4 is a positive lens having a largest Abbe number at the d line among positive lenses included in the imaging lens. In addition, Table 12 shows basic lens data of the imaging lens of Example 5, Table 13 shows data relating to specifications, Table 14 shows data relating to changing surface distances, and FIG. 12 shows a diagram of aberrations.

TABLE 13

EXAMPLE 5·SPECIFICATION (d LINE)

|  | WIDE-ANGLE END | TELEPHOTO END |
|---|---|---|
| ZOOM MAGNIFICATION | 1.0 | 30.9 |
| f | 12.87 | 397.18 |
| Bf | 25.0 | 25.0 |
| FNo. | 3.19 | 5.25 |
| 2ω[°] | 39.0 | 1.4 |

TABLE 14

EXAMPLE 5 VARIABLE SURFACE DISTANCE

|  | WIDE-ANGLE END | TELEPHOTO END |
|---|---|---|
| DD[8] | 0.94 | 94.39 |
| DD[15] | 92.27 | 14.77 |
| DD[18] | 18.60 | 1.46 |

Figure 6:
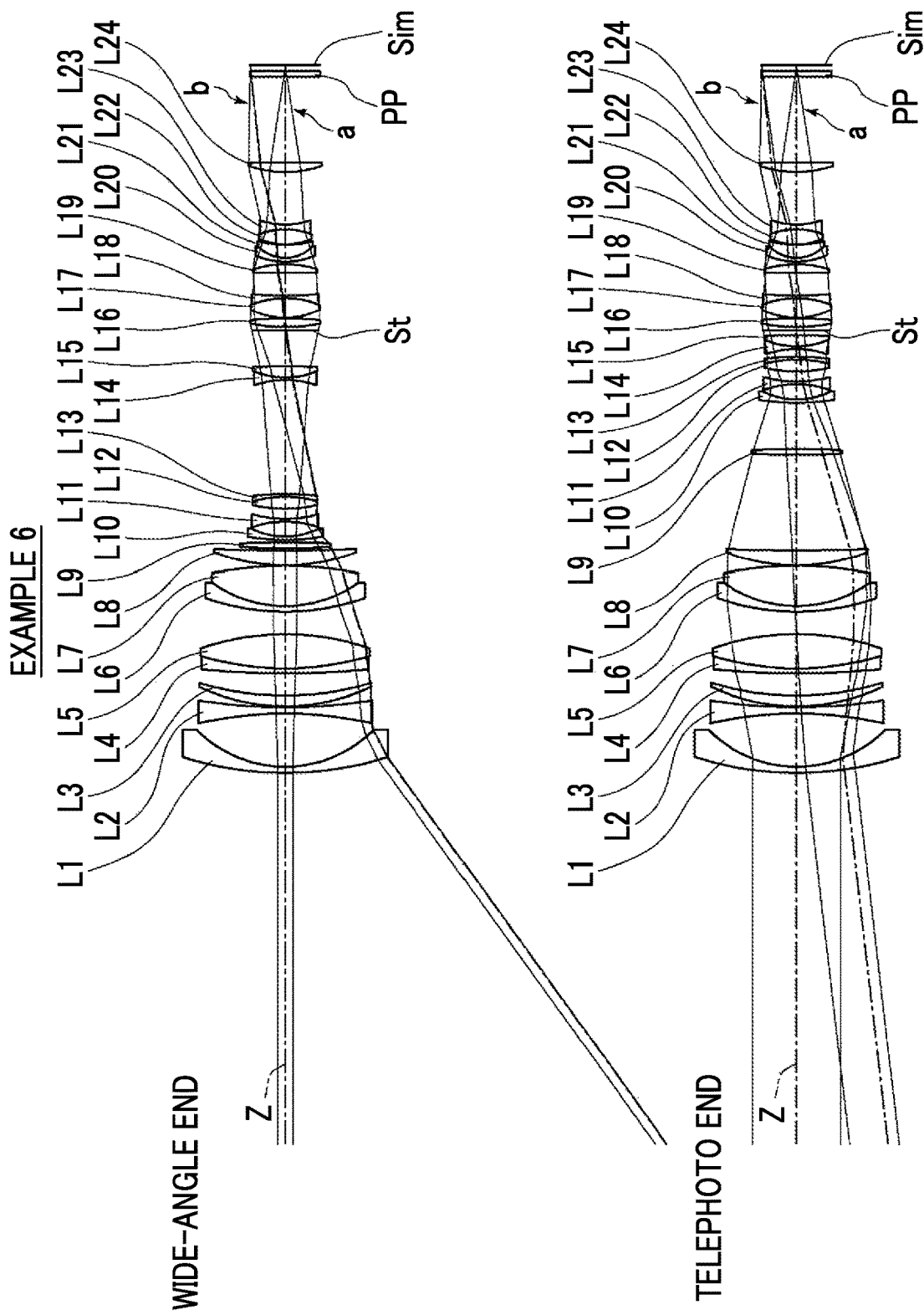
FIG. 6 is a cross-sectional view illustrating a lens configuration of an imaging lens of Example 6 of the present invention.

Next, an imaging lens of Example 6 will be described. FIG. 6 shows a cross-sectional view illustrating a lens configuration of the imaging lens of Example 6. The imaging lens of Example 6 has a zooming function, and is composed of twenty-four lenses, that is, lenses L1 to L24 in

TABLE 12

EXAMPLE 5·LENS DATA (n AND ν ARE BASED ON d LINE)

Figure 13:
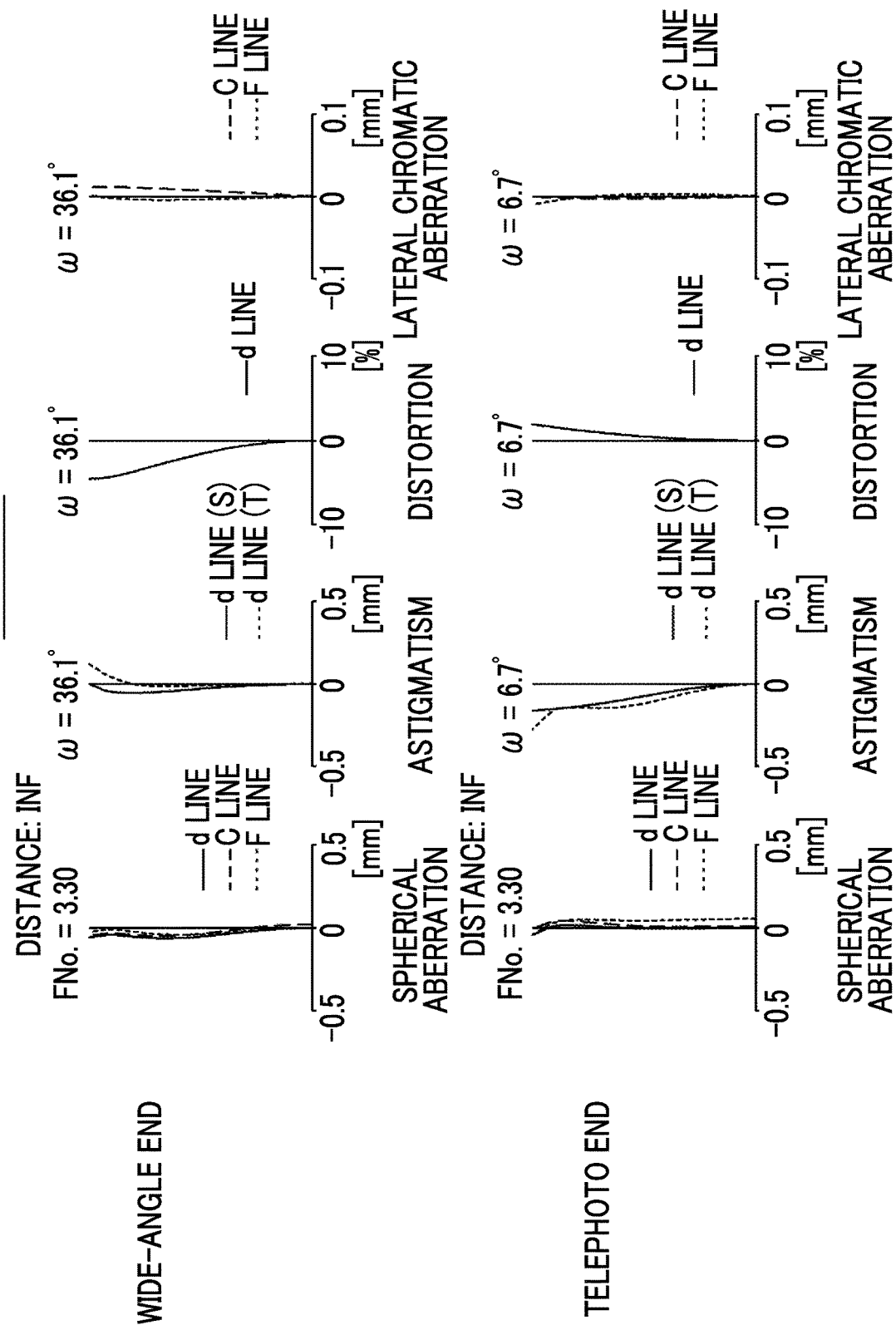
FIG. 13 is a diagram of aberrations of the imaging lens of Example 6 of the present invention.

| SURFACE NUMBER | CURVATURE RADIUS | SURFACE DISTANCE | n | ν | θgF | dn/dt | EXPRESSION (5) |
|---|---|---|---|---|---|---|---|
| 1 | 211.4312 | 2.8000 | 1.75500 | 52.32 | 0.54765 | 4.9 | 0.63230 |
| 2 | 86.9910 | 11.8070 | 1.61800 | 63.33 | 0.54414 | −3.6 | 0.64661 |
| 3 | −599.6501 | 0.1500 | | | | | |
| 4 | 209.6825 | 2.7000 | 1.81600 | 46.62 | 0.55682 | 5.2 | 0.63225 |
| 5 | 69.0890 | 11.3118 | 1.49700 | 81.54 | 0.53748 | −6.1 | 0.66941 |
| 6 | 665.9449 | 0.1500 | | | | | |
| 7 | 67.0279 | 10.3008 | 1.49700 | 81.54 | 0.53748 | −6.1 | 0.66941 |
| 8 | 325.0117 | DD[8] | | | | | |
| 9 | 26.1848 | 1.2000 | 1.83481 | 42.71 | 0.56431 | 4.7 | 0.63341 |
| 10 | 13.5873 | 7.6524 | | | | | |
| 11 | −49.9862 | 2.6648 | 1.80809 | 22.76 | 0.63073 | −0.2 | 0.66756 |
| 12 | −25.1370 | 1.1000 | 1.80400 | 46.57 | 0.55724 | 4.6 | 0.63259 |
| 13 | 73.3877 | 0.2104 | | | | | |
| 14 | 24.5654 | 2.8483 | 1.80518 | 25.42 | 0.61616 | 1.2 | 0.65729 |
| 15 | 45.2385 | DD[15] | | | | | |
| 16 | −37.5885 | 1.1000 | 1.83481 | 42.71 | 0.56431 | 4.7 | 0.63341 |
| 17 | 59.0000 | 2.2351 | 1.80809 | 22.76 | 0.63073 | −0.2 | 0.66756 |
| 18 | −196.5706 | DD[18] | | | | | |
| 19(STOP) | ∞ | 2.4800 | | | | | |
| 20 | 127.1671 | 5.8300 | 1.51680 | 64.20 | 0.53430 | 2.7 | 0.63818 |
| 21 | −37.6510 | 0.8800 | | | | | |
| 22 | 40.9980 | 6.2400 | 1.49700 | 81.54 | 0.53748 | −6.1 | 0.66941 |
| 23 | −40.9980 | 1.2000 | 1.72000 | 50.23 | 0.55214 | 5.5 | 0.63341 |
| 24 | 124.1341 | 0.9100 | | | | | |
| 25 | 34.1490 | 6.6200 | 1.49700 | 81.54 | 0.53748 | −6.1 | 0.66941 |
| 26 | −34.1490 | 1.2400 | 1.69930 | 51.11 | 0.55523 | −1.2 | 0.63793 |
| 27 | 38.3356 | 0.1000 | | | | | |
| 28 | 24.2208 | 6.0200 | 1.58913 | 61.13 | 0.54067 | 3.7 | 0.63958 |
| 29 | ∞ | 5.0000 | | | | | |
| 30 | 22.6812 | 2.0000 | 1.49700 | 81.54 | 0.53748 | −6.1 | 0.66941 |
| 31 | 15.0362 | 15.6200 | | | | | |
| 32 | 15.6369 | 4.9600 | 1.49700 | 81.54 | 0.53748 | −6.1 | 0.66941 |
| 33 | −21.6100 | 3.9700 | 1.91082 | 35.25 | 0.58224 | 5.2 | 0.63927 |
| 34 | 24.3818 | 7.1600 | | | | | |
| 35 | −249.3668 | 2.1500 | 1.94595 | 17.98 | 0.65460 | 3.6 | 0.68369 |
| 36 | −36.9311 | 22.2700 | | | | | |
| 37 | ∞ | 2.0000 | 1.51633 | 64.14 | 0.53531 | | |
| 38 | ∞ | 1.4581 | | | | | | order from the object side. In the imaging lens of Example 6, the lens L11 (its material is S-LAL20 manufactured by OHARA INC.) is a negative lens that satisfies Conditional Expressions (1) to (3), and the lens L7 is a positive lens having a largest Abbe number at the d line among positive lenses included in the imaging lens. In addition, Table 15 shows basic lens data of the imaging lens of Example 6, Table 16 shows data relating to specifications, Table 17 shows data relating to changing surface distances, and FIG. 13 shows a diagram of aberrations.

TABLE 15

EXAMPLE 6•LENS DATA (n AND ν ARE BASED ON d LINE)

| SURFACE NUMBER | CURVATURE RADIUS | SURFACE DISTANCE | n | ν | θgF | dn/dt | EXPRESSION (5) |
|---|---|---|---|---|---|---|---|
| 1 | 140.9205 | 2.5300 | 1.77250 | 49.60 | 0.55212 | 4.4 | 0.63237 |
| 2 | 52.2267 | 21.6512 | | | | | |
| 3 | −166.7985 | 2.6000 | 1.69560 | 59.05 | 0.54348 | −0.3 | 0.63902 |
| 4 | 235.2619 | 0.3854 | | | | | |
| 5 | 83.1939 | 4.4025 | 1.89286 | 20.36 | 0.63944 | 1.1 | 0.67238 |
| 6 | 124.9656 | DD[6] | | | | | |
| 7 | 355.5039 | 2.0000 | 1.75520 | 27.51 | 0.61033 | 2 | 0.65484 |
| 8 | 122.0348 | 14.0200 | 1.49700 | 81.54 | 0.53748 | −6.1 | 0.66941 |
| 9 | −106.8135 | DD[9] | | | | | |
| 10 | 103.2843 | 2.2198 | 1.59270 | 35.31 | 0.59336 | 0.1 | 0.65049 |
| 11 | 53.1587 | 16.2600 | 1.43875 | 94.66 | 0.53402 | −6.2 | 0.68718 |
| 12 | −153.8620 | 0.1200 | | | | | |
| 13 | 82.4682 | 6.1925 | 1.69560 | 59.05 | 0.54348 | −0.3 | 0.63902 |
| 14 | 640.7420 | DD[14] | | | | | |
| 15 | 356.7215 | 2.2993 | 1.49700 | 81.54 | 0.53748 | −6.1 | 0.66941 |
| 16 | −441.3212 | DD[16] | | | | | |
| 17 | 95.9105 | 1.3800 | 1.88300 | 40.76 | 0.56679 | 4.8 | 0.63274 |
| 18 | 31.5265 | 6.1493 | | | | | |
| 19 | −41.2079 | 1.0500 | 1.69930 | 51.11 | 0.55523 | −1.2 | 0.63793 |
| 20 | 48.9239 | 4.2053 | | | | | |
| 21 | 59.7630 | 4.8579 | 1.69895 | 30.13 | 0.60298 | 3.6 | 0.65173 |
| 22 | −49.8633 | 1.0600 | 1.69560 | 59.05 | 0.54348 | −0.3 | 0.63902 |
| 23 | −128.7417 | DD[23] | | | | | |
| 24 | −39.4445 | 1.0494 | 1.63246 | 63.77 | 0.54215 | −2.7 | 0.64533 |
| 25 | 34.4408 | 4.5400 | 1.62588 | 35.70 | 0.58935 | 2.7 | 0.64711 |
| 26 | −321.9409 | DD[26] | | | | | |
| 27(STOP) | ∞ | 1.4000 | | | | | |
| 28 | 78.1523 | 3.5579 | 1.91650 | 31.60 | 0.59117 | 7.3 | 0.64230 |
| 29 | −135.5103 | 0.1992 | | | | | |
| 30 | 31.0796 | 8.1314 | 1.49700 | 81.54 | 0.53748 | −6.1 | 0.66941 |
| 31 | −38.5780 | 1.1009 | 1.91082 | 35.25 | 0.58224 | 5.2 | 0.63927 |
| 32 | 160.9377 | 9.3847 | | | | | |
| 33 | −1849.3833 | 3.4782 | 1.74950 | 35.28 | 0.58704 | 5.8 | 0.64412 |
| 34 | −43.9996 | 0.9991 | | | | | |
| 35 | 31.9053 | 1.5458 | 1.90043 | 37.37 | 0.57720 | 4 | 0.63766 |
| 36 | 15.9095 | 5.4398 | 1.63246 | 63.77 | 0.54215 | −2.7 | 0.64533 |
| 37 | 45.1586 | 0.1200 | | | | | |
| 38 | 25.9984 | 6.1793 | 1.43875 | 94.66 | 0.53402 | −6.2 | 0.68718 |
| 39 | −29.8900 | 2.0000 | 1.95375 | 32.32 | 0.59015 | 4.3 | 0.64244 |
| 40 | 32.0497 | 21.3983 | | | | | |
| 41 | 48.7036 | 3.8155 | 1.72047 | 34.71 | 0.58350 | 3.5 | 0.63966 |
| 42 | 1630.0773 | 35.0000 | | | | | |
| 43 | ∞ | 2.3000 | 1.51633 | 64.14 | 0.53531 | | |
| 44 | ∞ | 2.8127 | | | | | |

TABLE 16

EXAMPLE 6•SPECIFICATION (d LINE)

| | WIDE-ANGLE END | TELEPHOTO END |
|---|---|---|
| ZOOM MAGNIFICATION | 1.0 | 5.8 |
| f | 20.83 | 120.51 |
| Bf | 39.3 | 39.3 |
| FNo. | 3.31 | 3.31 |
| 2ω[°] | 72.2 | 13.4 |

TABLE 17

EXAMPLE 6 VARIABLE SURFACE DISTANCE

| | WIDE-ANGLE END | TELEPHOTO END |
|---|---|---|
| DD[14] | 1.00 | 38.98 |
| DD[16] | 1.00 | 18.97 |

TABLE 17-continued

EXAMPLE 6 VARIABLE SURFACE DISTANCE

| | WIDE-ANGLE END | TELEPHOTO END |
|---|---|---|
| DD[23] | 46.55 | 3.25 |
| DD[26] | 14.65 | 2.00 |

Figure 7:
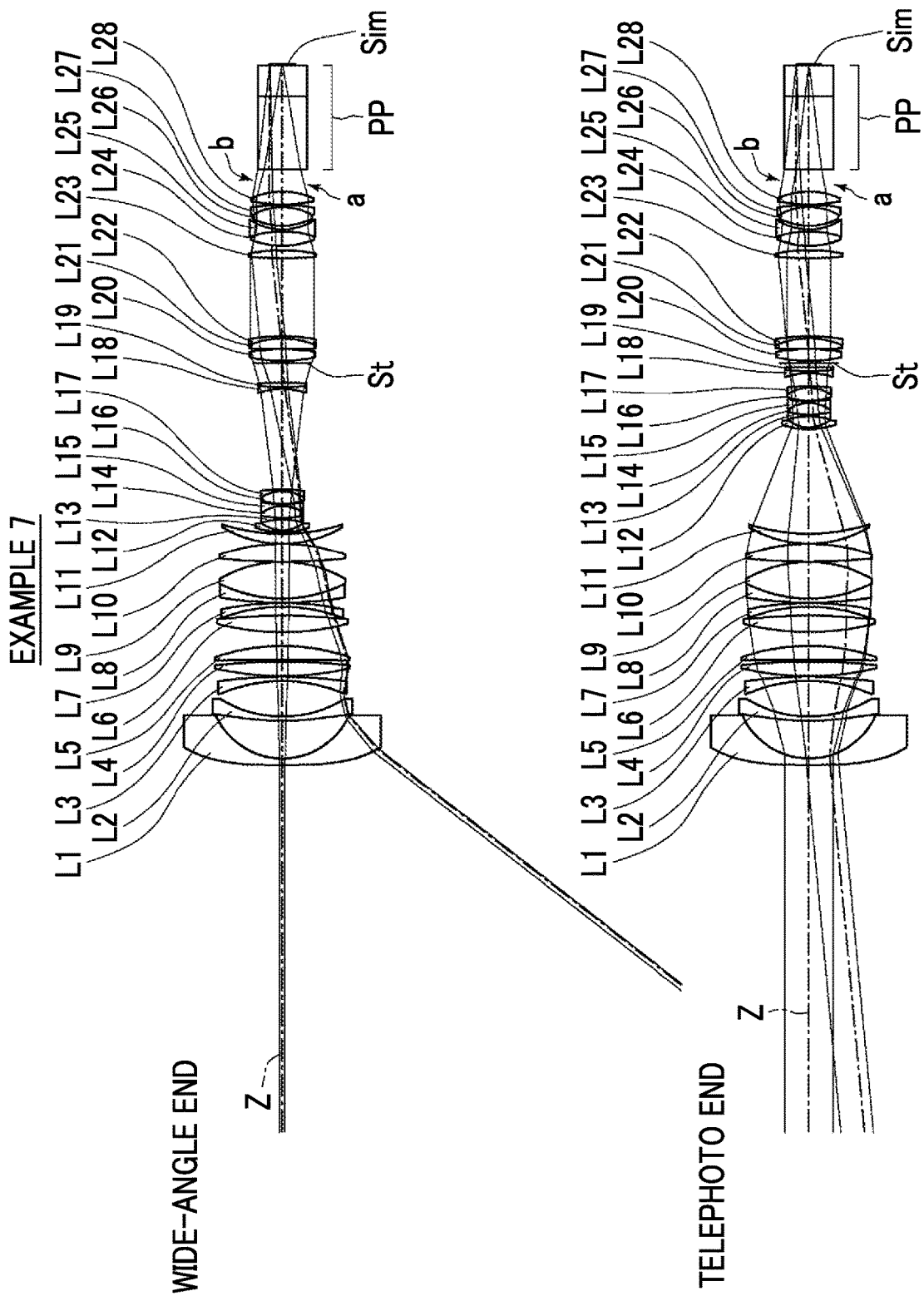
FIG. 7 is a cross-sectional view illustrating a lens configuration of an imaging lens of Example 7 of the present invention.
Figure 14:
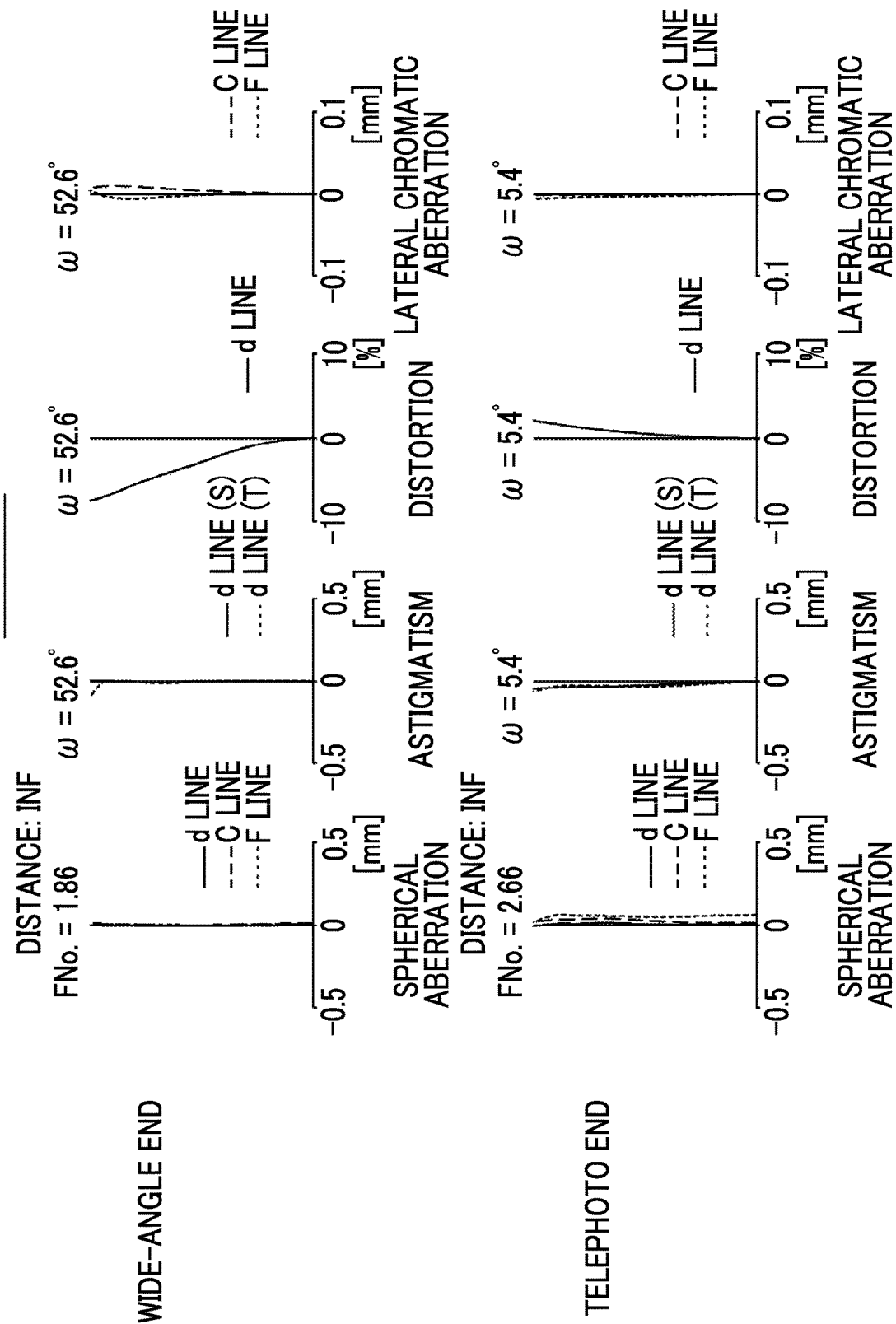
FIG. 14 is a diagram of aberrations of the imaging lens of Example 7 of the present invention.

Next, an imaging lens of Example 7 will be described. FIG. 7 shows a cross-sectional view illustrating a lens configuration of the imaging lens of Example 7. The imaging lens of Example 7 has a zooming function, and is composed of twenty-eight lenses, that is, lenses L1 to L28 in order from the object side. In the imaging lens of Example 7, the lens L18 (its material is S-LAL20 manufactured by OHARA INC.) is a negative lens that satisfies Conditional Expressions (1) to (3), and the lens L20 (its material is S-LAH52Q manufactured by OHARA INC.) is a positive lens that satisfies Conditional Expressions (7) to (9), and the lens L10 is a positive lens having a largest Abbe number at the d line among positive lenses included in the imaging lens. In addition, Table 18 shows basic lens data of the imaging lens of Example 7, Table 19 shows data relating to specifications, Table 20 shows data relating to changing surface distances, Table 21 shows data relating to aspherical coefficients, and FIG. 14 shows a diagram of aberrations.

TABLE 19

EXAMPLE 7·SPECIFICATION (d LINE)

|  | WIDE-ANGLE END | TELEPHOTO END |
|---|---|---|
| ZOOM MAGNIFICATION | 1.0 | 12.6 |
| f | 4.67 | 58.57 |
| Bf | 40.5 | 40.5 |
| FNo. | 1.86 | 2.66 |
| 2ω[°] | 105.2 | 10.8 |

TABLE 18

EXAMPLE 7·LENS DATA (n AND ν ARE BASED ON d LINE)

| SURFACE NUMBER | CURVATURE RADIUS | SURFACE DISTANCE | n | ν | θgF | dn/dt | EXPRESSION (5) |
|---|---|---|---|---|---|---|---|
| *1 | 565.2197 | 3.0000 | 1.80100 | 34.97 | 0.58642 | 3.6 | 0.64300 |
| 2 | 33.7366 | 17.0002 | | | | | |
| *3 | 121.9957 | 2.0000 | 1.49700 | 81.54 | 0.53748 | −6.1 | 0.66941 |
| 4 | 55.9914 | 15.9998 | | | | | |
| 5 | −72.3275 | 1.8899 | 1.95375 | 32.32 | 0.59015 | 4.3 | 0.64244 |
| 6 | −206.3175 | 0.3000 | | | | | |
| 7 | 134.4001 | 6.5789 | 1.84666 | 23.78 | 0.61923 | 0.6 | 0.65771 |
| 8 | −288.2885 | DD[8] | | | | | |
| 9 | −2499.1061 | 6.3166 | 1.53775 | 74.70 | 0.53936 | −4.3 | 0.66022 |
| 10 | −94.8862 | DD[10] | | | | | |
| 11 | 117.7845 | 7.6115 | 1.43875 | 94.66 | 0.53402 | −6.2 | 0.68718 |
| *12 | −177.1447 | 3.9652 | | | | | |
| 13 | −78.0906 | 1.8000 | 1.80100 | 34.97 | 0.58642 | 3.6 | 0.64300 |
| 14 | −132.5404 | 0.1200 | | | | | |
| 15 | 180.1651 | 1.8000 | 1.95375 | 32.32 | 0.59015 | 4.3 | 0.64244 |
| 16 | 64.4387 | 16.5240 | 1.43875 | 94.66 | 0.53402 | −6.2 | 0.68718 |
| 17 | −58.0608 | 0.1200 | | | | | |
| 18 | 265.1261 | 7.8469 | 1.43387 | 95.18 | 0.53733 | −10.1 | 0.69133 |
| 19 | −87.7409 | 0.1200 | | | | | |
| 20 | 54.2020 | 4.5533 | 1.72916 | 54.68 | 0.54451 | 4.1 | 0.63298 |
| 21 | 94.0953 | DD[21] | | | | | |
| 22 | 38.3802 | 0.8000 | 2.00100 | 29.13 | 0.59952 | 4 | 0.64665 |
| 23 | 15.4389 | 4.9352 | | | | | |
| 24 | −33.1368 | 0.8000 | 1.90043 | 37.37 | 0.57720 | 4.2 | 0.63766 |
| 25 | 51.3162 | 5.3048 | 1.80518 | 25.42 | 0.61616 | 1.2 | 0.65729 |
| 26 | −16.0812 | 0.8100 | 1.75500 | 52.32 | 0.54765 | 5 | 0.63230 |
| 27 | 62.8005 | 0.1200 | | | | | |
| 28 | 32.6354 | 5.8153 | 1.67270 | 32.10 | 0.59891 | 3 | 0.65085 |
| 29 | −17.4107 | 0.8000 | 1.95375 | 32.32 | 0.59015 | 4.3 | 0.64244 |
| 30 | −69.1716 | DD[30] | | | | | |
| 31 | −32.9450 | 0.8100 | 1.69930 | 51.11 | 0.55523 | −1.2 | 0.63793 |
| 32 | 90.0437 | 1.9099 | 1.92286 | 18.90 | 0.64960 | 2.1 | 0.68018 |
| 33 | −2000.0013 | DD[33] | | | | | |
| 34(STOP) | ∞ | 0.9999 | | | | | |
| *35 | 64.8090 | 5.2583 | 1.79952 | 42.24 | 0.56758 | 10.2 | 0.63592 |
| 36 | −101.6923 | 0.1200 | | | | | |
| 37 | 423.8735 | 4.7781 | 1.56883 | 56.36 | 0.54890 | 1.9 | 0.64009 |
| 38 | −39.3672 | 1.0000 | 1.95375 | 32.32 | 0.59015 | 4.3 | 0.64244 |
| 39 | −91.2427 | 35.3539 | | | | | |
| 40 | 171.3851 | 3.7643 | 1.85478 | 24.80 | 0.61232 | 4.4 | 0.65245 |
| 41 | −71.9178 | 1.9395 | | | | | |
| 42 | 39.6671 | 6.4312 | 1.48749 | 70.24 | 0.53007 | −0.8 | 0.64372 |
| 43 | −46.6783 | 1.0000 | 1.95375 | 32.32 | 0.59015 | 4.3 | 0.64244 |
| 44 | 26.9818 | 1.7762 | | | | | |
| 45 | 31.7333 | 8.3926 | 1.55032 | 75.50 | 0.54001 | −5.5 | 0.66217 |
| 46 | −26.9678 | 1.0000 | 1.95375 | 32.32 | 0.59015 | 4.3 | 0.64244 |
| 47 | −83.3955 | 0.1200 | | | | | |
| 48 | 68.1164 | 5.7708 | 1.48749 | 70.24 | 0.53007 | −0.8 | 0.64372 |
| 49 | −35.3678 | 10.0000 | | | | | |
| 50 | ∞ | 33.0000 | 1.60859 | 46.44 | 0.56664 | | |
| 51 | ∞ | 14.2000 | 1.51633 | 64.05 | 0.53463 | | |
| 52 | ∞ | 0.6341 | | | | | |

TABLE 20

EXAMPLE 7 VARIABLE SURFACE DISTANCE

|  | WIDE-ANGLE END | TELEPHOTO END |
|---|---|---|
| DD[21] | 0.69 | 47.22 |
| DD[30] | 45.22 | 5.91 |
| DD[33] | 9.00 | 1.78 |

TABLE 21

EXAMPLE 7 ASPHERICAL COEFFICIENT

| SURFACE NUMBER | 1 | 3 |
|---|---|---|
| KA | 1.0000000E+00 | 1.0000000E+00 |
| A4 | 2.2303957E−06 | −4.5266299E−07 |
| A6 | −7.8493629E−10 | −9.4818716E−10 |
| A8 | 9.3362230E−13 | 5.0541928E−12 |
| A10 | −1.3439006E−15 | −2.3924652E−14 |
| A12 | 1.2175718E−18 | 5.2090634E−17 |
| A14 | −6.6155710E−22 | −6.1618016E−20 |
| A16 | 2.1346249E−25 | 4.1238028E−23 |
| A18 | −3.7850627E−29 | −1.4731950E−26 |
| A20 | 2.8652251E−33 | 2.1700122E−30 |

| SURFACE NUMBER | 12 | 35 |
|---|---|---|
| KA | 1.0000000E+00 | 1.0000000E+00 |
| A4 | 1.2334578E−06 | −2.8403710E−06 |
| A6 | −9.7497468E−11 | 2.7887941E−10 |
| A8 | −6.2816070E−13 | 1.1936837E−11 |
| A10 | 3.0118492E−15 | −1.2231273E−13 |
| A12 | −9.7610693E−18 | 8.7181876E−16 |
| A14 | 1.8560380E−20 | −4.1438803E−18 |
| A16 | −2.0470604E−23 | 1.1853330E−20 |
| A18 | 1.2118640E−26 | −1.8191540E−23 |
| A20 | −2.9721665E−30 | 1.1446572E−26 |

Table 22 shows values corresponding to Conditional Expressions (1) to (13) of the imaging lens of Examples 1 to 7. Meanwhile, the d line is used as a reference wavelength in all the examples, and values shown in the following Table 22 are equivalent to those at this reference wavelength.

TABLE 22

| EXPRESSION NUMBER | CONDITIONAL EXPRESSION | EXAMPLE 1 | EXAMPLE 2 | EXAMPLE 3 | EXAMPLE 4 |
|---|---|---|---|---|---|
| (1) | nN | 1.69930 | 1.69930 | 1.69930 | 1.69930 |
| (2) | νN | 51.11 | 51.11 | 51.11 | 51.11 |
| (3) | dnN/dt | 1.2 | −1.2 | −1.2 | −1.2 |
| (4) | νP1 | 94.66 | 81.54 | 81.61 | 94.66 |
| (5) | θP1gF + 0.001618 × νP1 | 0.6872 | 0.6694 | 0.6709 | 0.6872 |
| (6) | \|fN\|/f | 0.75 | 3.30 | 1.15(t)~2.42(w) | 0.11(t)~8.40(w) 0.04(t)~2.86(w) |
| (7) | nP2 | 1.65100 | 1.79952 | 1.65100 1.79952 | NONE |
| (8) | νP2 | 56.24 | 42.24 | 56.24 42.24 | NONE |
| (9) | dnP2/dt | 6.6 | 10.2 | 6.6 10.2 | NONE |
| (10) | fP2/f | 0.22 | 3.00 | 2.52(t)~5.28(w) 1.61(t)~3.37(w) | NONE |
| (11) | \|HN/Hmax\| | 0.536 | 0.427 | NONE | NONE |
| (12) | \|(HNt/Htwm)/(HNw/Hwwm)\| | NONE | NONE | 1.432 | 12.493 0.483 |
| (13) | \|(HNt/Htwm)/(HNw/Hwwm)\| | NONE | NONE | 1.432 | 12.493 0.483 |

| EXPRESSION NUMBER | CONDITIONAL EXPRESSION | EXAMPLE 5 | EXAMPLE 6 | EXAMPLE 7 |
|---|---|---|---|---|
| (1) | nN | 1.69930 | 1.69930 | 1.69930 |
| (2) | νN | 51.11 | 51.11 | 51.11 |
| (3) | dnN/dt | −1.2 | −1.2 | −1.2 |
| (4) | νP1 | 81.54 | 94.66 | 95.18 |
| (5) | θP1gF + 0.001618 × νP1 | 0.6694 | 0.6872 | 0.6913 |
| (6) | \|fN\|/f | 0.06(t)~1.99(w) | 0.26(t)~1.53(w) | 0.59(0~7.37(w) |
| (7) | nP2 | NONE | NONE | 1.79952 |
| (8) | νP2 | NONE | NONE | 42.24 |
| (9) | dnP2/dt | NONE | NONE | 10.2 |
| (10) | fP2/f | NONE | NONE | 0.86(t)~10.75(w) |
| (11) | \|HN/Hmax\| | NONE | NONE | NONE |
| (12) | \|(HNt/Htwm)/(HNw/Hwwm)\| | 1.007 | 2.282 | 1.221 |
| (13) | \|(HNt/Htwm)/(HNw/Hwwm)\| | 1.007 | 2.282 | 1.221 |

From the above-mentioned data, it can be understood that the imaging lenses of Examples 1 to 7 all satisfy any of Conditional Expressions (1) to (10) and Conditional Expressions (11) to (13), and are imaging lenses in which various aberrations such as chromatic aberration and field curvature are satisfactorily corrected while satisfactorily correcting defocusing due to a change in temperature.

Figure 15:
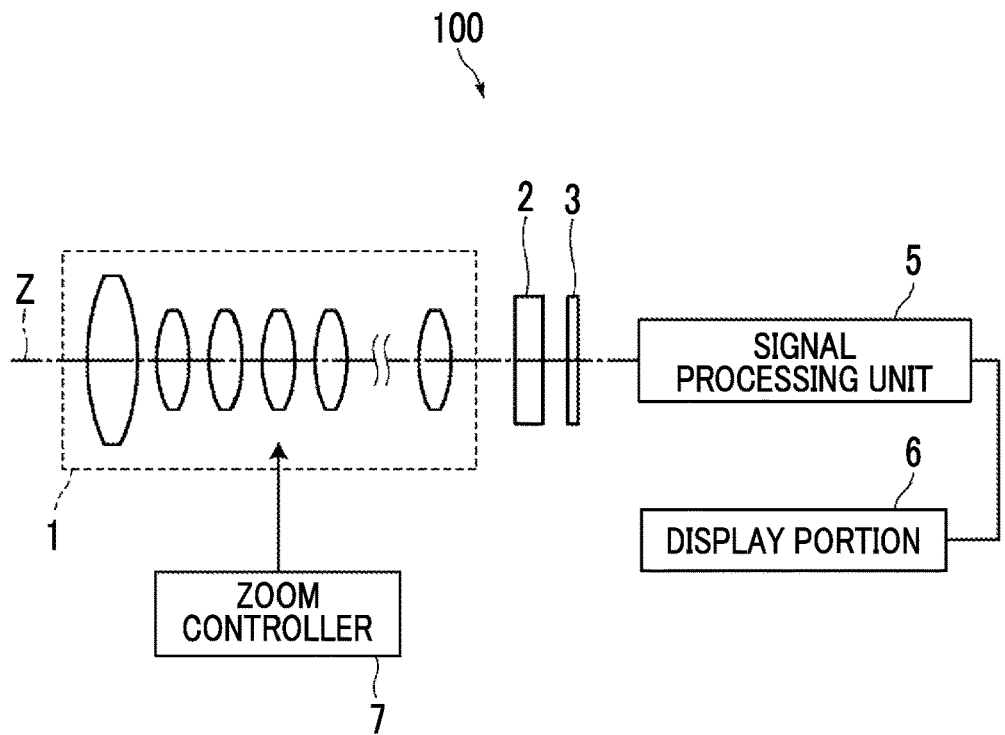
FIG. 15 is a schematic configuration diagram of an optical apparatus according to an embodiment of the present invention.

Next, an optical apparatus according to an embodiment of the present invention will be described. FIG. 15 shows a schematic configuration diagram of an optical apparatus 100 using an imaging lens 1 according to an embodiment of the present invention, as an example of an optical apparatus according to an embodiment of the present invention. An example of the optical apparatus 100 includes a motion-picture camera, a broadcast camera, a digital camera, a video camera, a surveillance camera, or the like.

The optical apparatus 100 includes the imaging lens 1, a filter 2 disposed on the image side of the imaging lens 1, and an imaging element 3 disposed on the image side of the filter 2. Meanwhile, in FIG. 15, a plurality of lenses included in the imaging lens 1 are schematically shown.

The imaging element 3 is used to convert an optical image formed by the imaging lens 1 into an electrical signal, and can have, for example, a charge coupled device (CCD), a complementary metal oxide semiconductor (CMOS) or the like used thereas. The imaging element 3 is disposed so that the imaging surface thereof is coincident with the image surface of the imaging lens 1.

In addition, the optical apparatus 100 includes a signal processing unit 5 that arithmetically processes an output signal from an imaging element 3, a display portion 6 that displays an image formed by the signal processing unit 5, and a zoom controller 7 that controls zooming of the imaging lens 1. Meanwhile, in FIG. 15, only one imaging element 3 is shown, but the optical apparatus of the present invention may be a so-called three-plate type of optical apparatus having three imaging elements without being limited.

Figure 16:
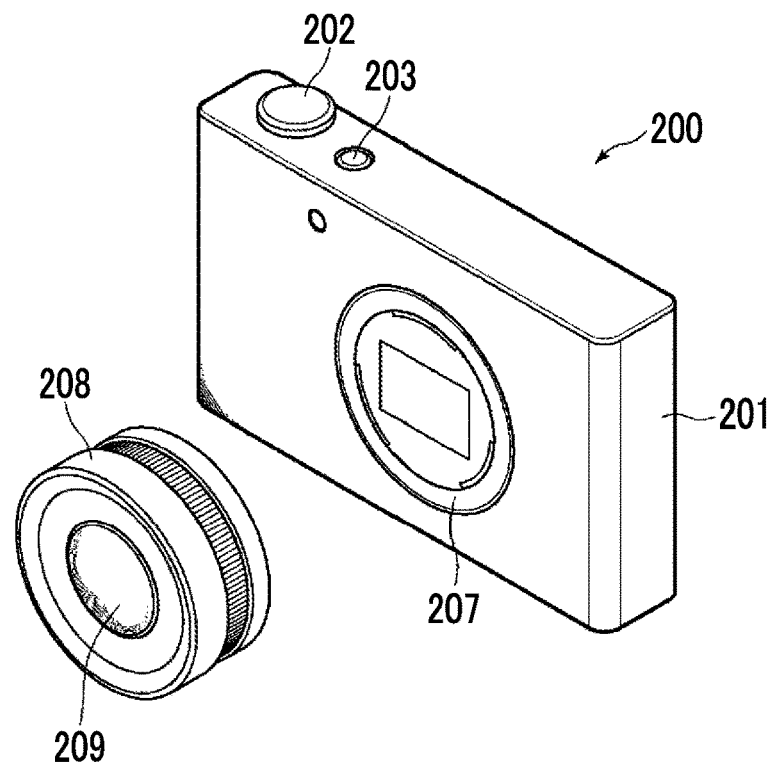
FIG. 16 is a perspective view illustrating a front side of an optical apparatus according to another embodiment of the present invention.
Figure 17:
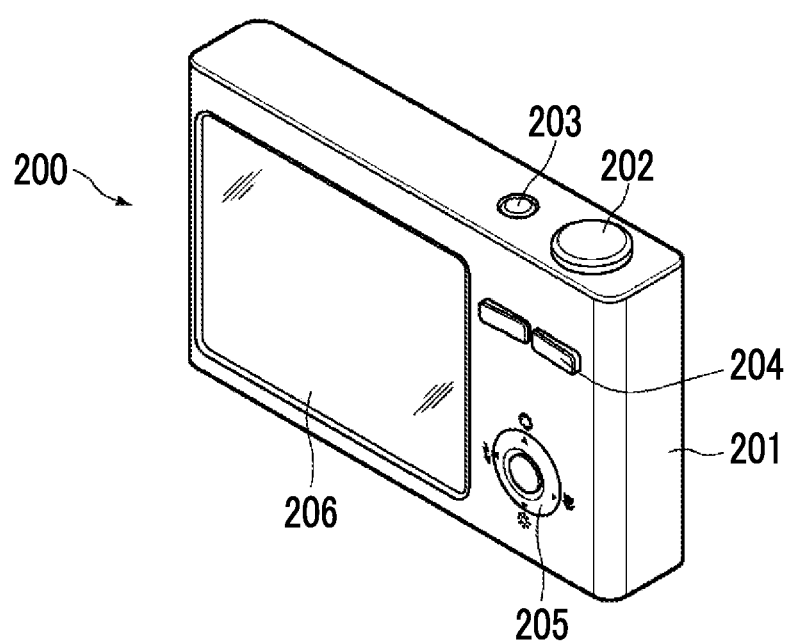
FIG. 17 is a perspective view illustrating a rear surface side of the optical apparatus of FIG. 16.

Next, an optical apparatus according to another embodiment of the present invention will be described with reference to FIGS. 16 and 17. A camera 200 showing perspective shapes of a front side and a rear surface side, respectively, in FIGS. 16 and 17 is a single-lens digital camera, having no reflex finder, which has an interchangeable lens 208 detachably mounted therein. The interchangeable lens 208 has an imaging lens 209 which is an optical system according to an embodiment of the present invention housed within a lens barrel.

This camera 200 includes a camera body 201, and is provided with a shutter button 202 and a power button 203 on the upper surface of the camera body 201. In addition, operating portions 204 and 205 and a display portion 206 are provided on the rear surface of the camera body 201. The display portion 206 is used for displaying a captured image or an image within an angle of view before image capture.

An imaging aperture on which light from an imaging target is incident is provided on the front central portion of the camera body 201, a mount 207 is provided at a position corresponding to the imaging aperture, and the interchangeable lens 208 is mounted onto the camera body 201 through this mount 207.

The camera body 201 is provided therein with an imaging element (not shown) such as a charge coupled device (CCD) or a complementary metal oxide semiconductor (CMOS) that outputs an imaging signal according to a subject image formed by the interchangeable lens 208, a signal processing circuit that processes the imaging signal which is output from the imaging element to generate an image, a recording medium for recording the generated image, and the like. In this camera 200, a still image or a motion picture can be captured by pressing the shutter button 202, and image data obtained by this image capture is recorded in the recording medium.

Hereinbefore, the present invention has been described through embodiments and examples, but the present invention is not limited to the above-described embodiments and examples, and can be variously modified. For example, values such as the curvature radius, the surface distance, the refractive index, and the Abbe number of each lens are not limited to the values shown in each of the above-described examples, and other values can be used therefor.

In addition, in the embodiment of the optical apparatus, a broadcast camera and a non-reflex type digital camera have been described by way of example with reference to the drawings, but the optical apparatus of the present invention is not limited thereto, and the present invention can also be applied to an optical apparatus such as, for example, a video camera, a digital camera other than a non-reflex type, or a motion-picture camera. Further, the optical apparatus including the imaging lens of the present invention may be applied to any apparatuses such as a projector without being limited to the cameras as described above.

EXPLANATION OF REFERENCES

1: imaging lens
2: filter
3: imaging element
5: signal processing unit
6: display portion
7: zoom controller
100: imaging apparatus
200: camera
201: camera body
202: shutter button
203: power button
204, 205: operating portion
206: display portion
207: mount
208: interchangeable lens
209: imaging lens
L1 to L30: lens
PP: optical member
Sim: image surface
St: aperture stop
a: on-axis light flux
b: light flux of maximum angle of view
Z: optical axis

What is claimed is:

1. An imaging lens in which a plurality of lenses are combined with each other, comprising:
at least one negative lens that satisfies the following Conditional Expressions (1) to (3) in a case where a refractive index at a d line of a negative lens included in the imaging lens is set to nN, an Abbe number at the d line of the negative lens is set to vN, and a rate of change of the refractive index at the d line of the negative lens with respect to a change in temperature at 25° C. is set to dnN/dt, $$1.65 < nN < 1.75 \quad (1)$$

$$45 < vN < 55 \quad (2)$$

$$dnN/dt < 0 \times 10^{-6}/°\text{ C.} \quad (3)$$

wherein a positive lens having a largest Abbe number at the d line among positive lenses included in the imaging lens satisfies the following Conditional Expressions (4) and (5) in a case where an Abbe number at the d line of the positive lens having a largest Abbe number at the d line is set to $vP1$, and a partial dispersion ratio of the positive lens having a largest Abbe number at the d line is set to $\theta P1gF$, $$63 < vP1 \tag{4}$$

$$0.644 < \theta P1gF + 0.001618 \times vP1 \tag{5}$$

2. The imaging lens according to claim 1,
wherein at least one negative lens among negative lenses that satisfy Conditional Expressions (1) to (3) satisfies the following Conditional Expression (6) in a case where a focal length of the negative lens is set to fN, and a focal length of the whole system during focusing on an infinite object is set to f, $$|fN|/f < 10 \tag{6}$$

3. The imaging lens according to claim 1, further comprising:
at least one positive lens that satisfies the following Conditional Expressions (7) to (9) in a case where a refractive index at the d line of a positive lens included in the imaging lens is set to nP2, an Abbe number at the d line of the positive lens is set to vP2, and a rate of change of the refractive index at the d line of the positive lens with respect to a change in temperature at 25° C. is set to dnP2/dt, $$1.6 < nP2 < 1.85 \tag{7}$$

$$40 < vP2 < 60 \tag{8}$$

$$6 \times 10^{-6}/°C. < dnP2/dt \tag{9}$$

4. The imaging lens according to claim 3,
wherein the positive lens that satisfies Conditional Expressions (7) to (9) satisfies the following Conditional Expression (10), in a case where a focal length of the positive lens is set to fP2, and a focal length of the whole system during focusing on an infinite object is set to f, $$fP2/f < 15 \tag{10}$$

5. The imaging lens according to claim 1,
wherein the imaging lens is a single-focus lens, and satisfies the following Conditional Expression (11) in a case where a height of a paraxial on-axis light ray on an object-side surface of the negative lens that satisfies Conditional Expressions (1) to (3) is set to HN, and a maximum value of heights of a paraxial on-axis light ray on each lens surface of all lenses included in the imaging lens is set to Hmax, $$0.3 < |HN/H\max| \tag{11}$$

6. The imaging lens according to claim 1,
wherein the imaging lens has a zooming function, and satisfies the following Conditional Expression (12) in a case where a height of a paraxial on-axis light ray at a telephoto end on an object-side surface of the negative lens that satisfies Conditional Expressions (1) to (3) is set to HNt, a height of a paraxial on-axis light ray at the telephoto end of a surface having a maximum height of a paraxial on-axis light ray at a wide-angle end on each lens surface of all lenses included in the imaging lens is set to Htwm, a height of a paraxial on-axis light ray at the wide-angle end on the object-side surface of the negative lens that satisfies Conditional Expressions (1) to (3) is set to HNw, and a maximum value of heights of a paraxial on-axis light ray at the wide-angle end on each lens surface of all lenses included in the imaging lens is set to Hwwm, $$|(HNt/Htwm)/(HNw/Hwwm)| < 1.8 \tag{12}$$

7. The imaging lens according to claim 1,
wherein the imaging lens has a zooming function, and satisfies the following Conditional Expression (13) in a case where a height of a paraxial on-axis light ray at a telephoto end on an object-side surface of the negative lens that satisfies Conditional Expressions (1) to (3) is set to HNt, a height of a paraxial on-axis light ray at the telephoto end of a surface having a maximum height of a paraxial on-axis light ray at a wide-angle end on each lens surface of all lenses included in the imaging lens is set to Htwm, a height of a paraxial on-axis light ray at the wide-angle end on the object-side surface of the negative lens that satisfies Conditional Expressions (1) to (3) is set to HNw, and a maximum value of heights of a paraxial on-axis light ray at the wide-angle end on each lens surface of all lenses included in the imaging lens is set to Hwwm, $$1.8 < |(HNt/Htwm)/(HNw/Hwwm)| \tag{13}$$

8. The imaging lens according to claim 1,
wherein the negative lens that satisfies Conditional Expressions (1) to (3) satisfies at least one of the following Conditional Expressions (1-1), (2-1), and (3-1), $$1.69 < nN < 1.71 \tag{1-1}$$

$$50 < vN < 52 \tag{2-1}$$

$$-2 \times 10^{-6}/°C. < dnN/dt < -1 \times 10^{-6}/°C. \tag{3-1}$$

9. The imaging lens according to claim 1,
wherein the positive lens having a largest Abbe number at the d line among positive lenses included in the imaging lens satisfies at least one of the following Conditional Expressions (4-1) and (5-1), $$75 < vP1 < 100 \tag{4-1}$$

$$0.665 < \theta P1gF + 0.001618 \times vP1 < 0.7 \tag{5-1}$$

10. The imaging lens according to claim 2,
wherein a negative lens that satisfies Conditional Expression (6) satisfies the following Conditional Expression (6-1), $$0.5 < |fN|/f < 5 \tag{6-1}$$

11. The imaging lens according to claim 3,
wherein the positive lens that satisfies Conditional Expressions (7) to (9) satisfies at least one of the following Conditional Expressions (7-1), (8-1), and (9-1), $$1.65 < nP2 < 1.8 \tag{7-1}$$

$$42 < vP2 < 57 \tag{8-1}$$

$$6.5 \times 10^{-6}/°C. < dnP2/dt < 11 \times 10^{-6}/°C. \tag{9-1}$$

12. The imaging lens according to claim 4,
wherein the positive lens that satisfies Conditional Expressions (7) to (9) satisfies the following Conditional Expression (10-1), $$0.2 < fP2/f < 5 \tag{10-1}$$

13. The imaging lens according to claim 5,
wherein the following Conditional Expression (11-1) is satisfied, $$0.49 \le |HN/H\max| < 1 \tag{11-1}$$

14. The imaging lens according to claim 6,
wherein the following Conditional Expression (12-1) is satisfied $$0.4 < |(HNt/Htwm)/(HNw/Hwwm)| < 1.5 \tag{12-1}$$

15. The imaging lens according to claim 7,
wherein the following Conditional Expression (13-1) is satisfied $$2 < |(HNt/Htwm)/(HNw/Hwwm)| < 50 \tag{13-1}$$

16. An optical apparatus comprising the imaging lens according to claim 1.

* * * * *